(12) United States Patent
Nakashima et al.

(10) Patent No.: US 10,480,479 B2
(45) Date of Patent: Nov. 19, 2019

(54) CONTROL DEVICE FOR ENGINE

(71) Applicant: Mazda Motor Corporation, Aki-gun, Hiroshima (JP)

(72) Inventors: Kenichi Nakashima, Hiroshima (JP); Keitaro Ezumi, Hiroshima (JP); Yuichiro Tsumura, Aki-gun (JP); Daisuke Tanaka, Hiroshima (JP); Taiki Maiguma, Hiroshima (JP); Takuji Okumura, Kure (JP); Kensuke Ashikaga, Hiroshima (JP); Masayoshi Higashio, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/058,122

(22) Filed: Aug. 8, 2018

(65) Prior Publication Data

US 2019/0063394 A1 Feb. 28, 2019

(30) Foreign Application Priority Data

Aug. 25, 2017 (JP) .................................. 2017-162685

(51) Int. Cl.
*F02P 5/15* (2006.01)
*F02D 41/30* (2006.01)
(Continued)

(52) U.S. Cl.
CPC ................ *F02P 5/152* (2013.01); *F02B 1/12* (2013.01); *F02B 7/00* (2013.01); *F02D 35/023* (2013.01);
(Continued)

(58) Field of Classification Search
CPC ....... F02D 19/02; F02D 19/024; F02D 19/025; F02D 21/02; F02D 35/02; F02D 35/023;
(Continued)

(56) References Cited

U.S. PATENT DOCUMENTS

2017/0292462 A1* 10/2017 Tsuda ...................... F02B 11/00
2018/0135539 A1* 5/2018 Tsuda ...................... F02D 41/22

FOREIGN PATENT DOCUMENTS

| JP | 2012246783 A | 12/2012 |
| JP | 2013057268 A | 3/2013 |
| JP | 5839972 B2 | 1/2016 |

* cited by examiner

*Primary Examiner* — John Kwon
*Assistant Examiner* — Johnny H Hoang
(74) *Attorney, Agent, or Firm* — Alleman Hall Creasman & Tuttle LLP

(57) ABSTRACT

A control device for an engine in which partial compression-ignition combustion including SI combustion performed by forcibly combusting a portion of mixture gas inside a cylinder followed by CI combustion performed by causing the rest of the mixture gas inside the cylinder to self-ignite is executed within a part of an operating range of the engine, is provided. The device includes a detector configured to detect a parameter related to noise caused by the combustion inside the cylinder, a memory configured to store a characteristic defining a relationship between a start timing of the CI combustion and a combustion noise index, and a processor configured to specify a given combustion noise index value based on the detection value of the detector, and control the start timing of the CI combustion.

14 Claims, 19 Drawing Sheets

(51) Int. Cl.
  *F02P 5/152* (2006.01)
  *F02B 1/12* (2006.01)
  *F02P 5/153* (2006.01)
  *F02D 35/02* (2006.01)
  *F02D 37/02* (2006.01)
  *F02B 7/00* (2006.01)
  *F02D 41/00* (2006.01)

(52) U.S. Cl.
  CPC .......... *F02D 37/02* (2013.01); *F02D 41/3041* (2013.01); *F02P 5/1502* (2013.01); *F02P 5/153* (2013.01); *F02D 2041/0015* (2013.01); *F02D 2200/025* (2013.01); *F02D 2200/0602* (2013.01)

(58) Field of Classification Search
  CPC .......... F02D 35/20; F02D 37/02; F02D 41/30; F02D 41/3041; F02D 41/40; F02P 5/15; F02P 5/1502; F02P 5/152; F02P 5/153; F02B 1/12; F02B 7/00
  See application file for complete search history.

CONTROL DEVICE FOR ENGINE

TECHNICAL FIELD

The present disclosure relates to a control device for an engine, which executes partial compression-ignition combustion in which mixture gas within a cylinder is partially forcibly combusted by spark-ignition (SI combustion) and then remaining mixture gas within the cylinder is combusted by self-ignition (CI combustion).

BACKGROUND OF THE DISCLOSURE

Recently, HCCI combustion in which gasoline fuel mixed with air is combusted by self-ignition inside a sufficiently compressed cylinder has attracted attention. This HCCI combustion has an issue that an ignition timing of mixture gas (a timing that the mixture gas self-ignites) greatly varies due to an external factor (e.g., atmospheric temperature) and an issue that a control during a transient operation in which an engine load sharply changes is difficult.

Therefore, instead of combusting all the mixture gas by self-ignition, it is proposed to combust a portion of the mixture gas by spark-ignition using a spark plug. That is, after forcibly combusting a portion of the mixture gas through flame propagation caused by spark-ignition (SI combustion), the rest of mixture gas is combusted by self-ignition (CI combustion). Hereinafter, such combustion is referred to as "partial compression-ignition combustion."

By forcibly combusting the portion of the mixture gas through flame propagation, the subsequent CI combustion is easily achieved. However, even in this case, the ignition timing of the CI combustion fluctuates, which leads to combustion noise fluctuation, due to the external factor, and the combustion noise may become excessive in the CI combustion.

JP5839972B discloses one method of controlling a combustion state of mixture gas, in which a sensor which detects pressure inside a cylinder (in-cylinder pressure) is provided, a combustion center-of-gravity timing (a timing at which 50% of a mass of the fuel supply into the cylinder combusts) based on the in-cylinder pressure detected by the sensor is calculated, and an ignition timing, etc. are suitably controlled so that the combustion center-of-gravity timing becomes suitable.

However, in the partial compression-ignition combustion, the SI combustion and the CI combustion occur as described above. The combustion center-of-gravity timing also changes depending on a ratio between the SI combustion and CI combustion, etc. Therefore, in the partial compression-ignition combustion, simply controlling the combustion center-of-gravity timing to be suitable may not sufficiently reduce the combustion noise caused by the CI combustion.

SUMMARY OF THE DISCLOSURE

The present disclosure is made in view of the above situations and aims to provide a control device for an engine, which more reliably prevents combustion noise from becoming excessive in partial compression-ignition combustion.

According to one aspect of the present disclosure, a control system for a compression-ignition engine is provided. The control system includes an engine having a cylinder, a piston, a cylinder head, and a combustion chamber formed by the cylinder, the piston, and the cylinder head, a spark plug disposed in the combustion chamber, a fuel injection valve disposed to be oriented into the combustion chamber, an in-cylinder pressure sensor connected to the combustion chamber and configured to detect pressure inside the combustion chamber, and a control unit including a processor connected to the spark plug, the fuel injection valve, and the pressure sensor, and configured to output a control signal to the spark plug, the fuel injection valve, and the pressure sensor, respectively. The control unit executes a combustion noise index value calculating module to calculate, based on the output value of the in-cylinder pressure sensor, a first combustion noise index value that is an in-cylinder pressure level at a given high frequency, and a second combustion noise index value that is an in-cylinder pressure level at a given low frequency, a limit value calculating module to calculate a limit value of a start timing of the CI combustion based on the first combustion noise index value and the second combustion noise index value, an ignition timing setting module to set an ignition timing so that the start timing of the CI combustion does not advance beyond the limit value, and a spark plug controlling module to output an ignition instruction to the spark plug at the ignition timing set by the ignition timing setting module.

The control unit may be further configured to execute a detection period setting module to set a crank angle period in which the in-cylinder pressure sensor sequentially performs the detection, and an amplitude value calculating module to calculate an amplitude value of the in-cylinder pressure for each frequency based on an output value of the in-cylinder pressure sensor during the detection period. The combustion noise index value calculating module may calculate the first combustion noise index value and the second combustion noise index value based on an output value of the amplitude value calculating module.

The limit value calculating module may calculate the start timing limit value of the CI combustion based on an allowable limit map in which the allowable value of the first combustion noise index value is set higher as an engine speed increases, and an allowable limit map in which the allowable value of the second combustion noise index value is set higher as the engine speed increases.

The limit value calculating module may calculate the start timing limit value of the CI combustion based on an allowable limit map in which the allowable value of the first combustion noise index value is set higher as an engine load increases, and an allowable limit map in which the allowable value of the second combustion noise index value is set higher as the engine load increases.

According to another aspect of the present disclosure, a method of controlling a compression-ignition engine including a cylinder, a piston, a cylinder head, a combustion chamber formed by the cylinder, the piston, and the cylinder head, a spark plug disposed in the combustion chamber, and a fuel injection valve disposed to be oriented into the combustion chamber is provided. The method includes detecting an in-cylinder pressure that is a pressure inside the combustion chamber, calculating, based on the detected in-cylinder pressure, a first combustion noise index value that is an in-cylinder pressure level at a given high frequency, and a second combustion noise index value that is an in-cylinder pressure level at a given low frequency, calculating a limit value of a start timing of the CI combustion based on the first combustion noise index value and the second combustion noise index value, setting an ignition timing so that the start timing of the CI combustion does not advance beyond the limit value, and causing the spark plug to ignite at the set ignition timing.

The method may further include setting a crank angle period in which the in-cylinder pressure is sequentially detected, calculating an amplitude value of the in-cylinder pressure for each frequency based on the detected in-cylinder pressure during the detection period, and calculating the first combustion noise index value and the second combustion noise index value based on the calculated amplitude value.

The start timing limit value of the CI combustion may be calculated based on an allowable limit map in which the allowable value of the first combustion noise index value is set higher as an engine speed increases, and an allowable limit map in which the allowable value of the second combustion noise index value is set higher as the engine speed increases.

The start timing limit value of the CI combustion may be calculated based on an allowable limit map in which the allowable value of the first combustion noise index value is set higher as an engine load increases, and an allowable limit map in which the allowable value of the second combustion noise index value is set higher as the engine load increases.

According to further another aspect of the present disclosure, a control device for an engine in which partial compression-ignition combustion including spark ignition (SI) combustion performed by forcibly combusting a portion of mixture gas inside a cylinder followed by compression ignition (CI) combustion performed by causing the rest of the mixture gas inside the cylinder to self-ignite is executed within a part of an operating range of the engine is provided. The control device includes a detector configured to detect a parameter related to noise caused by the combustion inside the cylinder, a memory configured to store a characteristic defining a relationship between a start timing of the CI combustion and a combustion noise index, and a processor configured to specify a given combustion noise index value based on the detection value of the detector, and control the start timing of the CI combustion based on the characteristic and the combustion noise index value.

According to this aspect of the present disclosure, the combustion noise index value correlated with noise caused by the combustion inside the cylinder, i.e., combustion noise, is calculated based on the detection value of the detector, and the start timing of the CI combustion is controlled based on the calculated combustion noise index value and the characteristic defining the relationship between this combustion noise index value and the start timing of the CI combustion. That is, the start timing of the CI combustion is controlled using a parameter correlated with the combustion noise, which is the combustion noise index value. Therefore, in the partial compression-ignition combustion, the start timing of the CI combustion is suitably adjusted to prevent the combustion noise from becoming excessive. Thus, the partial compression-ignition combustion is appropriately achieved and the combustion noise is reduced while improving fuel efficiency.

The processor may obtain a distribution of a plurality of combustion noise index values calculated at a plurality of time points, set an allowable limit of the combustion noise index value based on the distribution, determine a target θci that is a target start timing of the CI combustion based on the allowable limit and the characteristic, and control the combustion inside the cylinder to achieve the determined target θci.

With this configuration, the allowable value of the combustion noise index value and the target θci are determined in consideration of the distribution of the combustion noise index values, i.e., the variation of the combustion noise index values. Therefore, a possibility that loud combustion noise exceeding the allowable limit incidentally occurs is reduced.

In this configuration, the processor may specify, based on the detection value of the detector, an SI knock index value correlated with SI knock in which unburned gas outside an area of the cylinder where the SI combustion of the mixture gas occurs combusts rapidly by abnormal local self-ignition, and a CI knock index value correlated with CI knock in which noise at a lower frequency than that in the SI knock occurs during the CI combustion, as the combustion noise index value. The memory may store, as the characteristic, a first characteristic defining the relationship between the start timing of the CI combustion and the SI knock index value, and a second characteristic defining the relationship between the start timing of the CI combustion and the CI knock index value. The processor may set an allowable limit of the SI knock index value based on a distribution of a plurality of SI knock index values specified at a plurality of time points and the first characteristic, and an allowable limit of the CI knock index value based on a distribution of a plurality of CI knock index values specified at a plurality of time points and the second characteristic, obtain a first θci limit that is a limit of the start timing of the CI combustion by which the SI knock index value is kept below the allowable limit based on the first characteristic stored in the memory, obtain a second θci limit that is a limit of the start timing of the CI combustion by which the CI knock index value is kept below the allowable limit based on the first characteristic stored in the memory, determine a timing that is the same as or later than either one of the first θci limit and the second θci limit as the target θci, and control the combustion inside the cylinder so that the determined target θci is achieved.

According to this configuration, the first θci limit for keeping the SI knock index value below the allowable limit and the second θci limit for keeping the CI knock index value below the allowable limit are suitably derived using the first and second characteristics, and by executing a given combustion control (e.g., adjusting an ignition timing) so that the CI combustion does not start earlier than the first and second θci limits, both the SI and CI knock index values are reliably kept lower than the allowable limits, respectively. Therefore, during the execution of the partial compression-ignition combustion combining the SI combustion and the CI combustion, i.e., during the operation in which both the SI knock caused by the SI combustion and the CI knock caused by the CI combustion are a concern, the SI knock and CI knock are avoided from becoming apparent. Further, since the allowable limits of the SI and CI knock index values are calculated in consideration of variations thereof, a possibility that large knock (loud combustion noise) exceeding the allowable limit incidentally occurs is reduced.

The processor may calculate a standard deviation among the plurality of SI knock index values; set, as the allowable limit of the SI knock index value, a value obtained by subtracting the standard deviation among the SI knock index values from a given reference limit of the SI knock index value; calculate a standard deviation among the plurality of CI knock index values; and set, as the allowable limit of the CI knock index value, a value obtained by subtracting the standard deviation among the CI knock index values from a given reference limit of the CI knock index value.

BRIEF DESCRIPTION OF THE DRAWINGS

FIGS. 11A and 11B are maps used for determining an allowable limit of each of an SI knock index value and a CI knock index value, in which FIG. 11A is a map for determining the allowable limit of the SI knock index value, and FIG. 11B is a map for determining the allowable limit of the CI knock index value.

FIGS. 13A and 13B are maps used for determining a target value (target θci) of a start timing of the CI combustion, in which FIG. 13A illustrates a map defining a relationship between a start timing (θci) of the CI combustion and the SI knock index value, and FIG. 13B illustrates a map defining a relationship between a start timing (θci) of the CI combustion and the CI knock index value.

DETAILED DESCRIPTION OF THE DISCLOSURE (1) Overall Configuration of Engine

Figure 1:
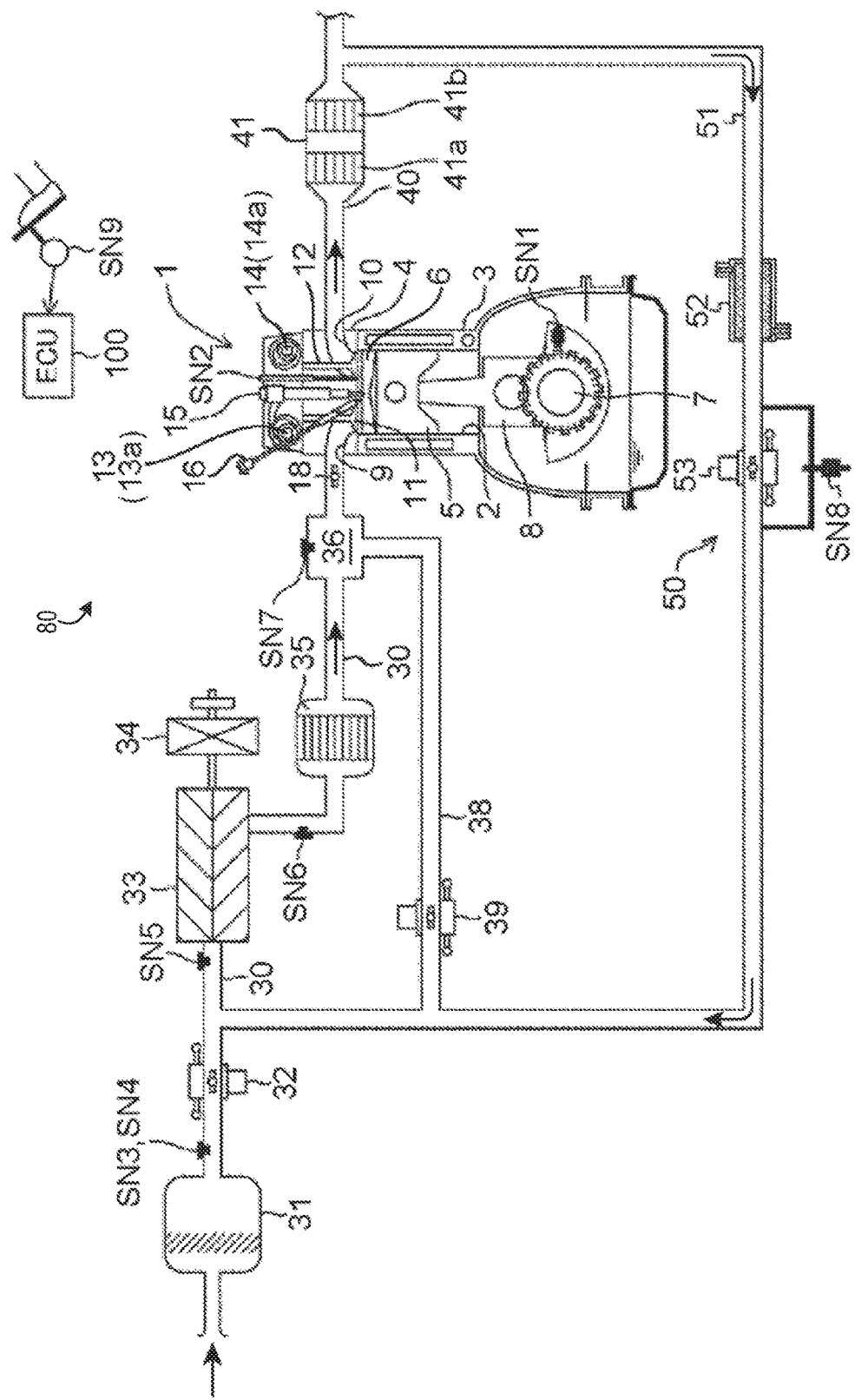
FIG. 1 is a system diagram schematically illustrating an overall configuration of an engine according to one embodiment of the present disclosure.
Figure 2:
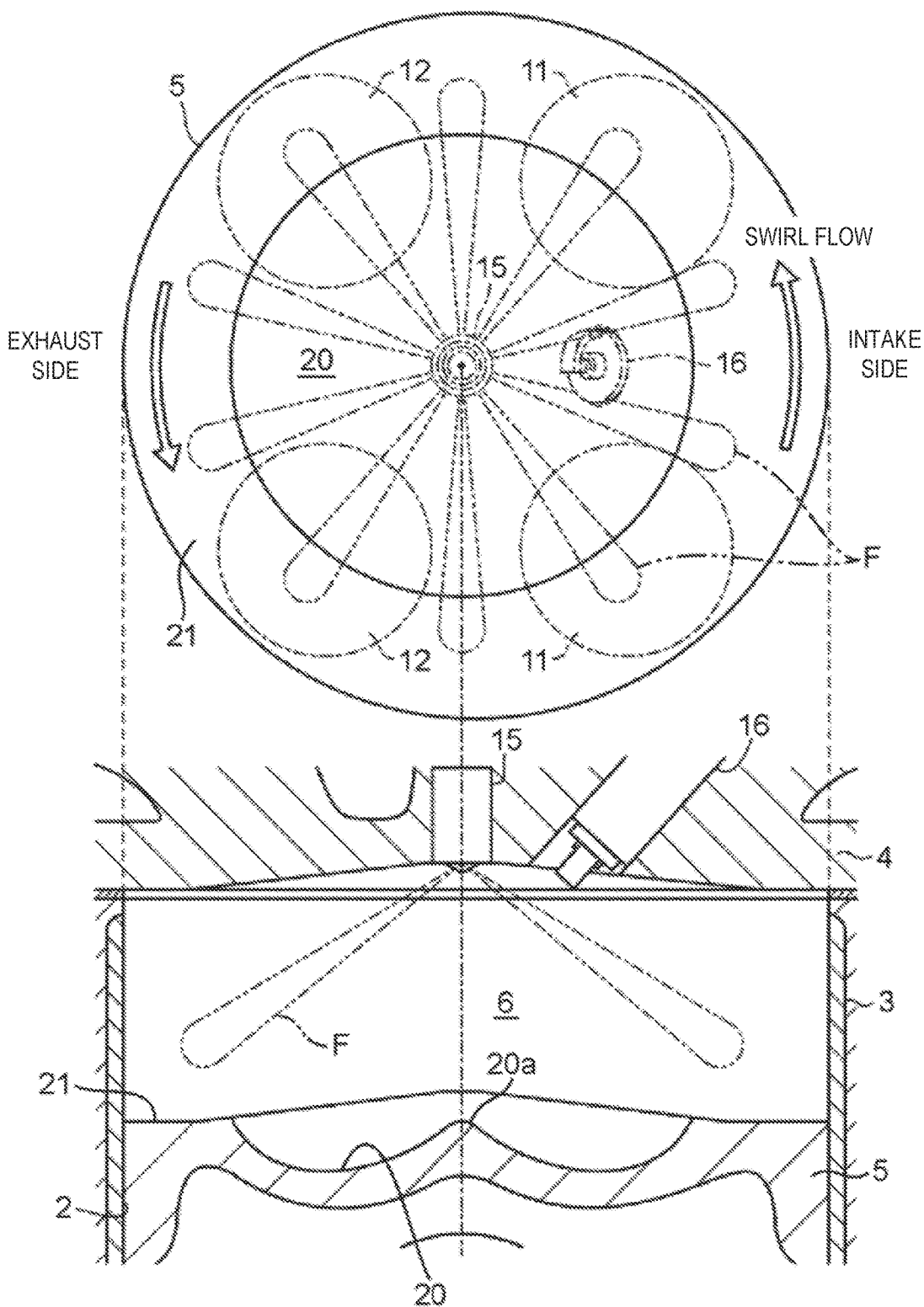
FIG. 2 shows diagrams illustrating a cross-sectional view of an engine body and a plan view of a piston.

FIGS. 1 and 2 are diagrams illustrating a suitable embodiment of an engine to which a control device of the present disclosure is applied. The engine illustrated in FIGS. 1 and 2 is a four-cycle gasoline direct-injection engine mounted on a vehicle as a drive source for traveling, and includes an engine body 1, an intake passage 30 through which intake air to be introduced into the engine body 1 flows, an exhaust passage 40 through which exhaust gas discharged from the engine body 1 flows, and an EGR device 50 which recirculates a portion of the exhaust gas flowing through the exhaust passage 40 to the intake passage 30.

The engine body 1 has a cylinder block 3 formed therein with cylinders 2, a cylinder head 4 attached to an upper surface of the cylinder block 3 so as to cover the cylinders 2 from above, and a piston 5 reciprocatably fitted into each cylinder 2. Typically, the engine body 1 is of a multi-cylinder type having a plurality of cylinders (e.g., four cylinders). Here, the description is only given regarding one cylinder 2 for the sake of simplicity.

A combustion chamber 6 is defined above the piston 5, and fuel containing gasoline as a main component is injected into the combustion chamber 6 by an injector 15 (described later). Further, the supplied fuel is combusted while being mixed with air in the combustion chamber 6, and expansion force caused by this combustion pushes down the piston 5 and thus it reciprocates in up-and-down directions of the cylinder. Note that the fuel injected into the combustion chamber 6 may be any fuel as long as it contains gasoline as a main component, for example, it may contain a subcomponent, such as bioethanol, in addition to gasoline.

A crankshaft 7 which is an output shaft of the engine body 1 is provided below the piston 5. The crankshaft 7 is connected to the piston 5 via a connecting rod 8 and rotates about its center axis according to the reciprocation (up-and-down motion) of the piston 5.

A geometric compression ratio of the cylinder 2, that is, a ratio of the volume of the combustion chamber 6 when the piston 5 is at a top dead center (TDC) with the volume of the combustion chamber 6 when the piston 5 is at a bottom dead center (BDC), is set between 13:1 and 30:1 as a suitable value for SPCCI combustion (partial compression-ignition combustion) described later. More specifically, the geometric compression ratio of the cylinder 2 is set between 14:1 and 17:1 in regular specifications using gasoline fuel having an octane number of about 91, and between 15:1 and 18:1 in high-octane specifications using gasoline fuel having an octane number of about 96.

The cylinder block 3 is provided with a crank angle sensor SN1 which detects a rotational angle (crank angle) and rotational speed (engine speed) of the crankshaft 7.

The cylinder head 4 is formed with an intake port 9 and an exhaust port 10 which open into the combustion chamber 6, and provided with an intake valve 11 which opens and closes the intake port 9, and an exhaust valve 12 which opens and closes the exhaust port 10. Note that, as illustrated in FIG. 2, the type of valve of the engine of this embodiment is a four-valve type including two intake valves and two exhaust valves. That is, the intake port 9 includes a first intake port 9A and a second intake port 9B, and the exhaust port 10 includes a first exhaust port 10A and a second exhaust port 10B. A total of two intake valves 11 are provided so as to open and close the first and second intake ports 9A and 9B, respectively, and a total of two exhaust valves 12 are provided so as to open and close the first and second exhaust ports 10A and 10B, respectively.

Figure 3:
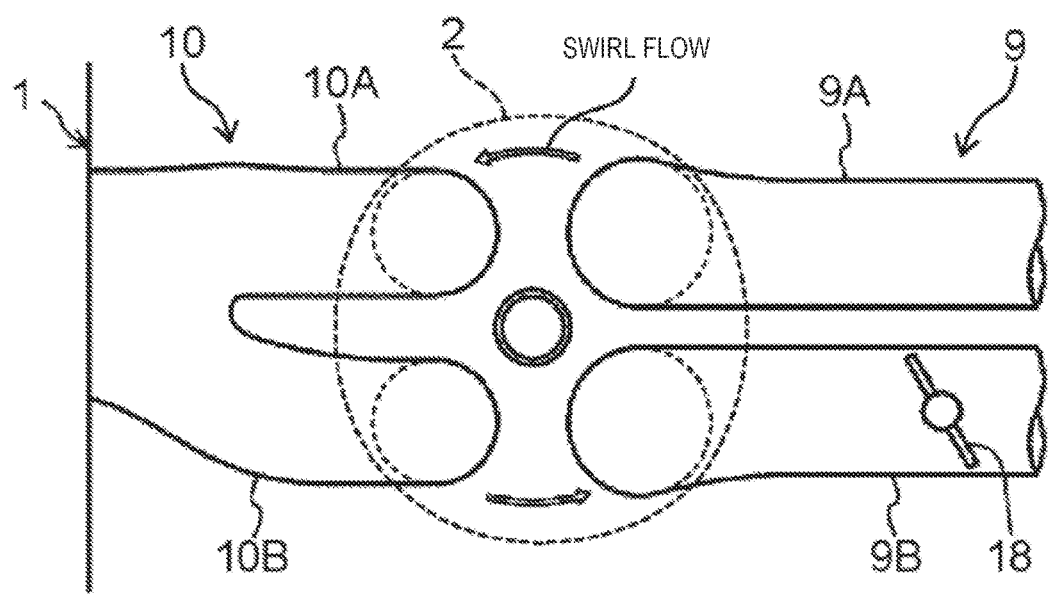
FIG. 3 is a schematic plan view illustrating a structure of a cylinder and intake and exhaust systems in the vicinity thereof.

As illustrated in FIG. 3, a swirl valve 18 openable and closable of the second intake port 9B is provided therein. The swirl valve 18 is only provided in the second intake port 9B, and not provided in the first intake port 9A. When such a swirl valve 18 is driven in the closing direction, since a rate of intake air flowing into the combustion chamber 6 from the first intake port 9A in which the swirl valve 18 is not provided increases, a circling flow (swirl flow) circling around an axial line of the cylinder is enhanced. Conversely, driving the swirl valve 18 in the opening direction weakens the circling flow.

The intake valve 11 and the exhaust valve 12 are driven to open and close in conjunction with the rotation of the crankshaft 7 by valve operating mechanisms 13 and 14 including a pair of camshafts disposed in the cylinder head 4.

The valve operating mechanism 13 for the intake valve 11 is built therein with an intake VVT 13a changeable of at least an open timing of the intake valve 11. Similarly, the valve operating mechanism 14 for the exhaust valve 12 is built therein with an exhaust VVT 14a changeable of at least a close timing of the exhaust valve 12. By controlling the intake VVT 13a and the exhaust VVT 14a, in this embodiment, a valve overlap period in which both the intake and exhaust valves 11 and 12 are opened over TDC of exhaust stroke is adjusted, and by adjusting the valve overlap period, an amount of burned gas remaining in the combustion chamber 6 (internal EGR gas) is adjusted. Note that the intake VVT 13a (exhaust VVT 14a) may be a variable mechanism which changes only the close timing (open timing) while fixing the open timing (close timing) of the intake valve 11 (exhaust valve 12), or a phase-variable mechanism which simultaneously changes the open timing and the close timing of the intake valve 11 (exhaust valve 12).

The cylinder head 4 is provided with the injector 15 which injects the fuel (mainly gasoline) into the combustion chamber 6, and a spark plug 16 which ignites mixture gas containing the fuel injected into the combustion chamber 6 from the injector 15 and air introduced into the combustion chamber 6. The cylinder head 4 is further provided with an in-cylinder pressure sensor SN2 which detects pressure of the combustion chamber 6 (hereinafter, also referred to as in-cylinder pressure). Note that the in-cylinder pressure sensor SN2 corresponds to a "detector."

As illustrated in FIG. 2, on a crown surface of the piston 5, a cavity 20 is formed by denting a relatively wide area of the piston 5, including a center part thereof, to the opposite side from the cylinder head 4 (downward). A center section of the cavity 20 is formed with a bulge portion 20a having a substantially conical shape, bulging relatively upward, and both sides of the cavity 20 over the bulge portion 20a in radial directions respectively form a bowl-shaped recessed portion in cross section. In other words, the cavity 20 is a recessed portion having a donut shape in plan view, formed to surround the bulge portion 20a. Further, a section of the crown surface of the piston 5 radially outward of the cavity 20 is a squish portion 21 comprised of an annular flat surface.

The injector 15 is a multi-port injector having a plurality of nozzle ports at its tip portion, and the fuel is injected radially from the plurality of nozzle ports ("F" in FIG. 2 indicates fuel spray injected from the respective nozzle ports). The injector 15 is provided so that its tip portion opposes to the center portion (bulge portion 20a) of the crown surface of the piston 5.

The spark plug 16 is disposed at a somewhat offset position to the intake side with respect to the injector 15. The tip portion (electrode portion) of the spark plug 16 is set at a position overlapping with the cavity 20 in the plan view.

As illustrated in FIG. 1, the intake passage 30 is connected to one side surface of the cylinder head 4 to communicate with the intake ports 9. Air (fresh air) taken in from an upstream end of the intake passage 30 is introduced into the combustion chamber 6 through the intake passage 30 and the intake port 9.

In the intake passage 30, in order from the upstream side, an air cleaner 31 which removes foreign matters within the intake air, a throttle valve 32 which adjusts a flow rate of intake air by opening and closing, a booster 33 which pumps the intake air while compressing it, an intercooler 35 which cools the intake air compressed by the booster 33, and a surge tank 36.

An airflow sensor SN3 which detects the flow rate of intake air, first and second intake air temperature sensors SN4 and SN6 which detect the temperature of the intake air, and first and second intake air pressure sensors SN5 and SN7 which detect pressure of the intake air are provided in various parts of the intake passage 30. The airflow sensor SN3 and the first intake air temperature sensor SN4 are provided in a portion of the intake passage 30 between the air cleaner 31 and the throttle valve 32, and detect the flow rate and the temperature of the intake air passing through this portion. The first intake air pressure sensor SN5 is provided in a portion of the intake passage 30 between the throttle valve 32 and the booster 33 (downstream of a connection port of an EGR passage 51 described later), and detects the pressure of the intake air passing through this portion. The second intake air temperature sensor SN6 is provided in a portion of the intake passage 30 between the booster 33 and the intercooler 35, and detects the temperature of intake air passing through this portion. The second intake air pressure sensor SN7 is provided in the surge tank 36 and detects the pressure of intake air in the surge tank 36.

The booster 33 is a mechanical booster (supercharger) mechanically linked to the engine body 1. Although the specific type of the booster 33 is not particularly limited, for example, any of known boosters, such as Lithoum type, Roots type, or centrifugal type, may be used as the booster 33.

An electromagnetic clutch 34 electrically switchable of its operation mode between "engaged" and "disengaged" is provided between the booster 33 and the engine body 1. When the electromagnetic clutch 34 is engaged, driving force is transmitted from the engine body 1 to the booster 33, and boosting by the booster 33 is performed. On the other hand, when the electromagnetic clutch 34 is disengaged, the transmission of the driving force is interrupted, and the boosting by the booster 33 is stopped.

A bypass passage 38 which bypasses the booster 33 is provided in the intake passage 30. The bypass passage 38 connects the surge tank 36 to the EGR passage 51 described later. A bypass valve 39 which opens and closes is provided in the bypass passage 38.

The exhaust passage 40 is connected to the other side surface of the cylinder head 4 so as to communicate with the exhaust port 10. Burned gas (exhaust gas) generated in the combustion chamber 6 is discharged outside through the exhaust port 10 and the exhaust passage 40.

A catalytic converter 41 is provided in the exhaust passage 40. The catalytic converter 41 is built therein with a three-way catalyst 41a which purifies hazardous components contained within the exhaust gas flowing through the exhaust passage 40 (HC, CO, and NOx), and a GPF (gasoline-particulate filter) 41b which captures a particulate matter (PM) contained within the exhaust gas. Note that another catalytic converter built therein with a suitable catalyst, such as a three-way catalyst or a NOx catalyst, may be added downstream of the catalytic converter 41.

The EGR device 50 has the EGR passage 51 connecting the exhaust passage 40 to the intake passage 30, and an EGR cooler 52 and an EGR valve 53 provided in the EGR passage 51. The EGR passage 51 connects a portion of the exhaust passage 40 downstream of the catalytic converter 41 to a portion of the intake passage 30 between the throttle valve 32 and the booster 33. The EGR cooler 52 cools the exhaust gas recirculated from the exhaust passage 40 to the intake passage 30 through the EGR passage 51 (external EGR gas) by heat exchange. The EGR valve 53 is provided in the EGR passage 51 downstream of the EGR cooler 52 (the side close to the intake passage 30), and adjusts the flow rate of the exhaust gas flowing through the EGR passage 51.

A pressure difference sensor SN8 which detects a difference between pressure upstream of the EGR valve 53 and pressure downstream thereof is provided in the EGR passage 51.

(2) Control System

Figure 4:
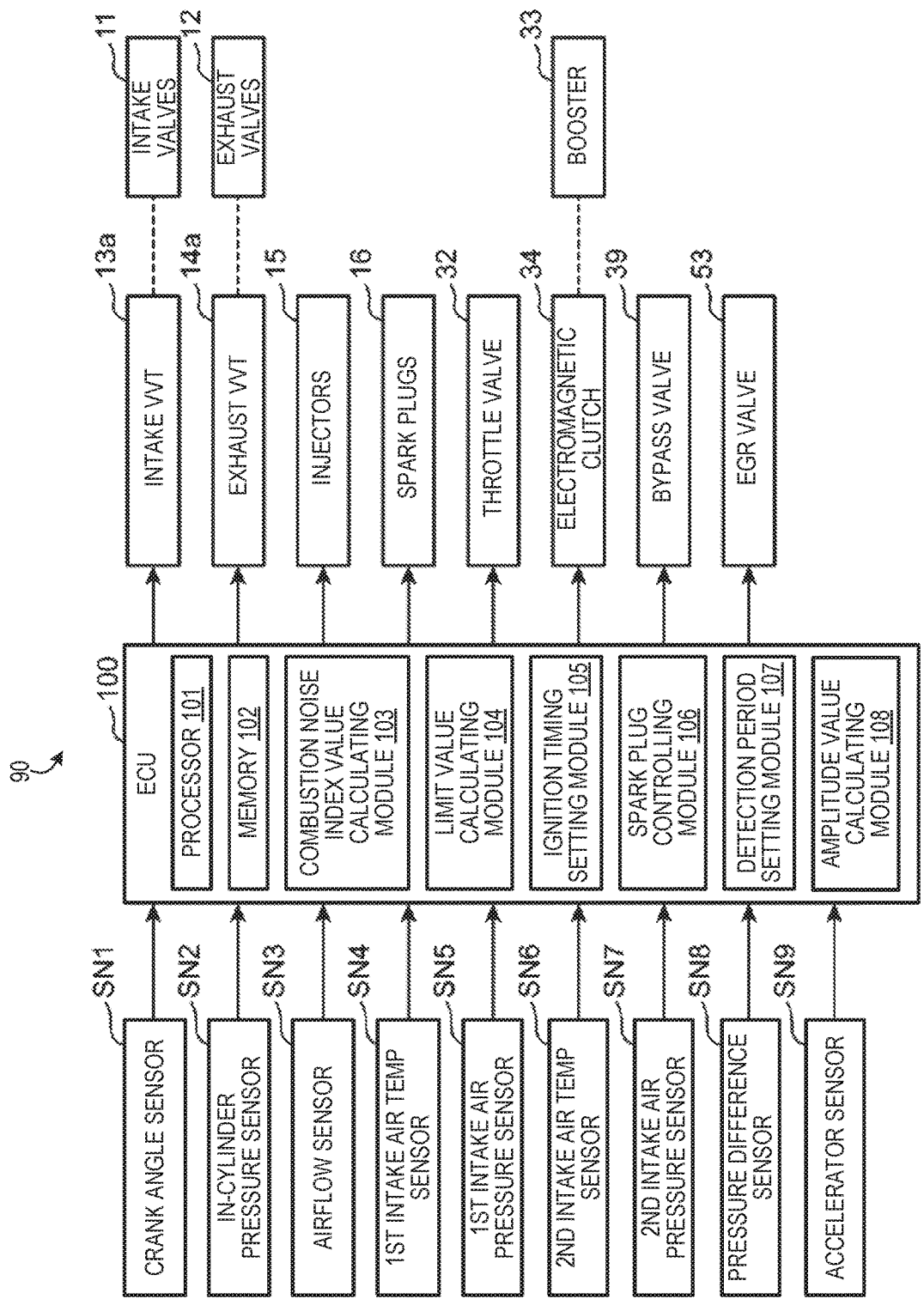
FIG. 4 is a block diagram illustrating a control device of the engine.

FIG. 4 is a block diagram illustrating a control device 90 of the engine. A control system 80 of FIG. 1 may include the control device 90 of FIG. 4 and the engine 1. An ECU 100 illustrated in FIG. 4 is a microprocessor which comprehensively controls the engine, and comprised of a well-known processor 101 (e.g., a CPU) and memory 102 (e.g., ROM and RAM). The ECU 100 includes a combustion noise index value calculating module 103, a limit value calculating module 104, an ignition timing setting module 105, a spark plug controlling module 106, a detection period setting module 107, and an amplitude value calculating module 108. The processor 101 is configured to execute the modules, stored in the memory 102 as software, in order to achieve their respective functions.

The ECU 100 receives detection signals from various sensors. For example, the ECU 100 is electrically connected to the crank angle sensor SN1, the in-cylinder pressure sensor SN2, the airflow sensor SN3, the first and second intake air temperature sensors SN4 and SN6, the first and second intake pressure sensors SN5 and SN7, and the pressure difference sensor SN8, which are described above. The ECU 100 sequentially receives the information detected by these sensors (i.e., the crank angle, the engine speed, the in-cylinder pressure, the intake air flow rate, the intake air temperatures, the intake air pressures, the difference in pressure between the upstream and downstream sides of the EGR valve 53, etc.).

Further, an accelerator sensor SN9 which detects an opening of an accelerator pedal controlled by a vehicle driver driving the vehicle is provided in the vehicle, and a detection signal from the accelerator sensor SN9 is also inputted to the ECU 100.

The ECU 100 controls various components of the engine while executing various determinations and calculations based on the input signals from the various sensors. That is, the ECU 100 is electrically connected to the intake VVT 13a, the exhaust VVT 14a, the injector 15, the spark plug 16, the throttle valve 32, the electromagnetic clutch 34, the bypass valve 39, the EGR valve 53, etc., and outputs control signals to these components based on various calculation results.

(3) Control According to Operating State

Figure 5:
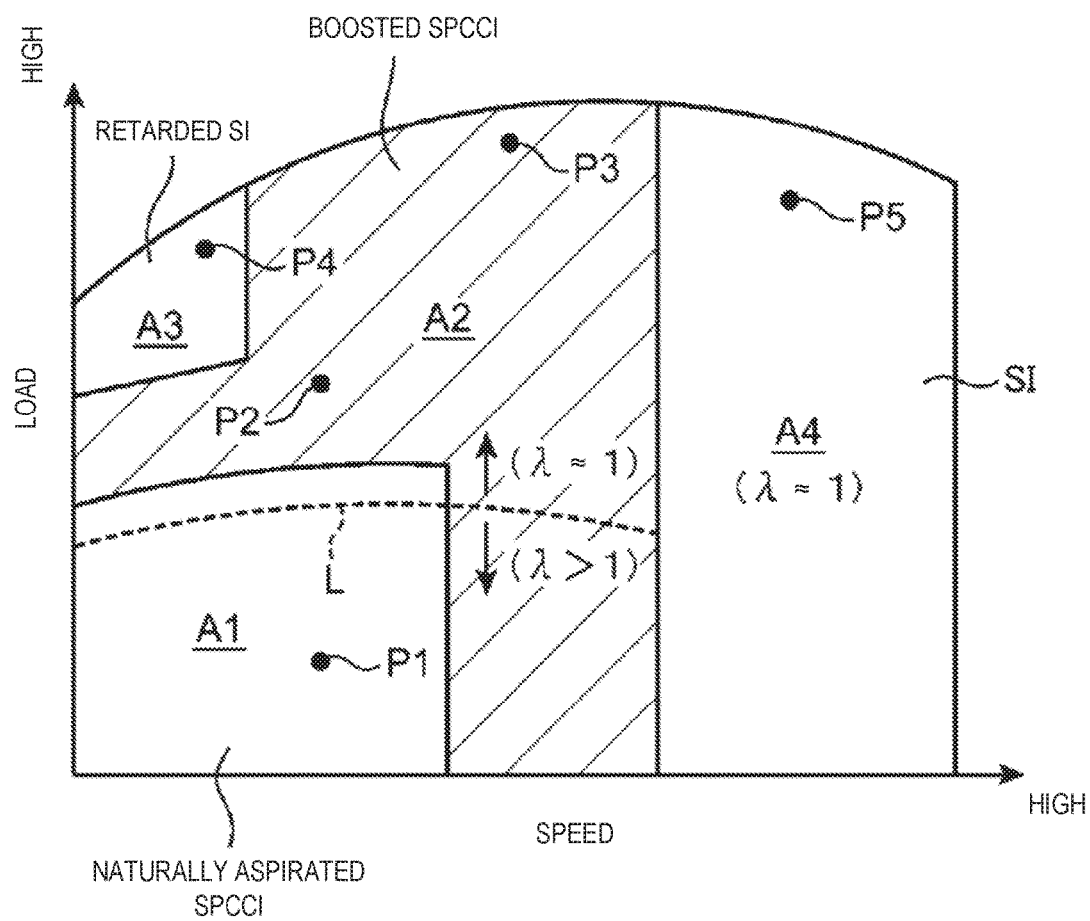
FIG. 5 is a chart of a map in which operating ranges of the engine are divided according to a difference in combustion mode.

FIG. 5 is a chart of a map illustrating a difference in control according to an engine speed and load. As illustrated in FIG. 5, an operating range of the engine is roughly divided into four operating ranges A1 to A4 due to the difference in combustion mode. When the four operating ranges are the first operating range A1, the second operating range A2, the third operating range A3, and the fourth operating range A4, the first operating range A1 is a low-speed and low-load range in which both the engine speed and load are low, the third operating range A3 is a low-speed and high-load range in which the engine speed is low and the engine load is high, the fourth operating range A4 is a high-speed range in which the engine speed is high, and the second operating range A2 is the rest of the range excluding the first, third, and fourth operating ranges A1, A3 and A4 (i.e., the range combined a low-speed medium-load range and a medium speed range). Hereinafter, the combustion mode etc. selected in each operating range will be sequentially described.

(a) First Operating Range

Within the first operating range A1 in which the engine speed is low and the engine load is low, the partial compression-ignition combustion combining the SI combustion and the CI combustion (hereinafter referred to as "SPCCI combustion") is performed in a state where the boosting by the booster 33 is stopped (naturally aspirated state). Note that "SPCCI" in the SPCCI combustion is an abbreviation for "SPark Controlled Compression Ignition."

Here, the SI combustion is a mode in which the mixture gas is ignited by the spark plug 16 and is then forcibly combusted by flame propagation which spreads the combusting region from the ignition point, and the CI combustion is a mode in which the mixture gas is combusted by self-ignition in an environment increased in temperature and pressure due to the compression of the piston 5. The SPCCI combustion combined the SI combustion and the CI combustion is a combustion mode in which the SI combustion is performed on a portion of the mixture gas in the combustion chamber 6 by the spark-ignition performed in an environment immediately before the mixture gas self-ignites, and after the SI combustion, the CI combustion is performed on the rest of the mixture gas in the combustion chamber 6 by self-ignition (by the further increase in temperature and pressure accompanying the SI combustion).

Figure 6:
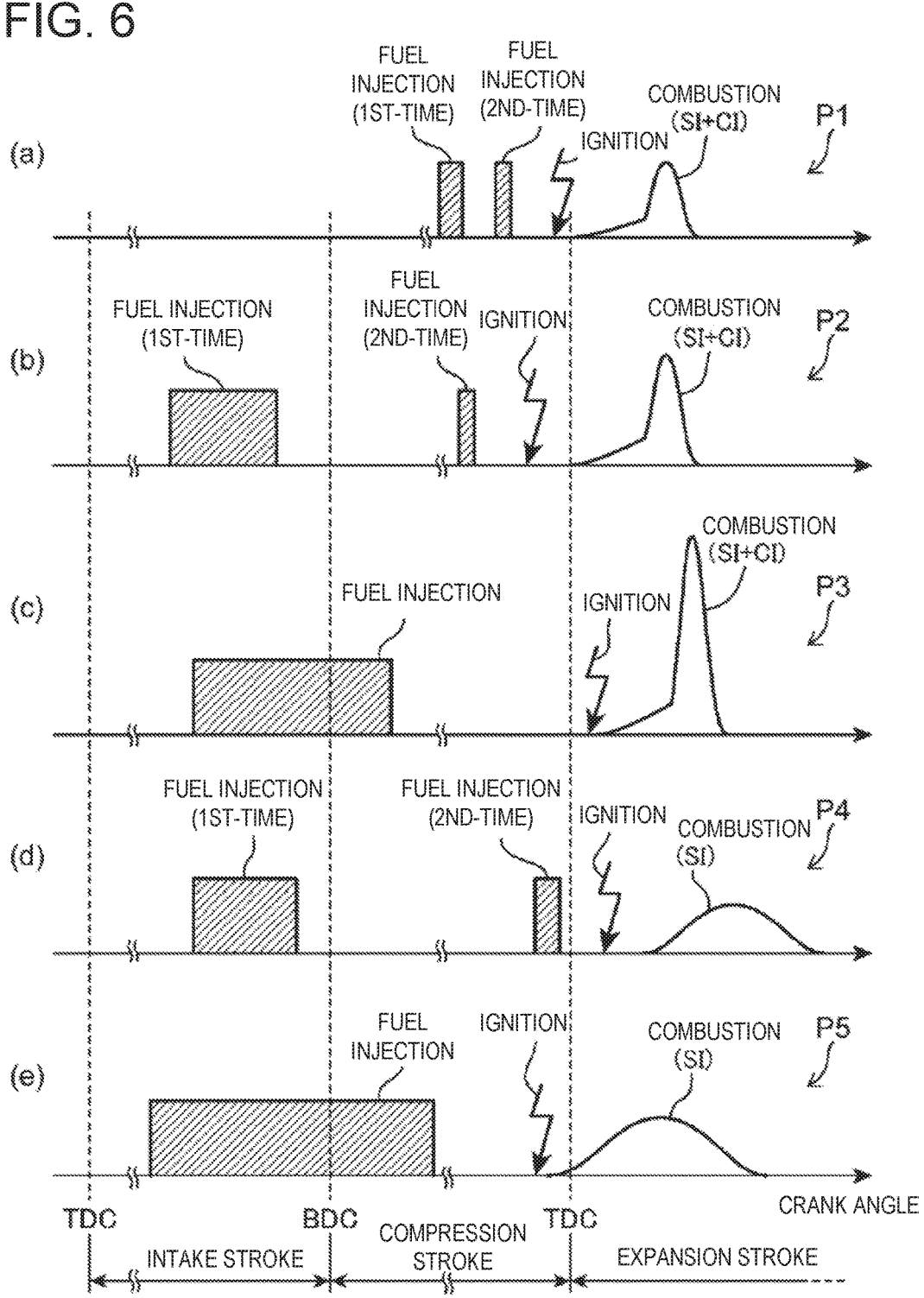
FIG. 6 shows time charts schematically illustrating a combustion control executed in each operating range of the engine.
Figure 7:
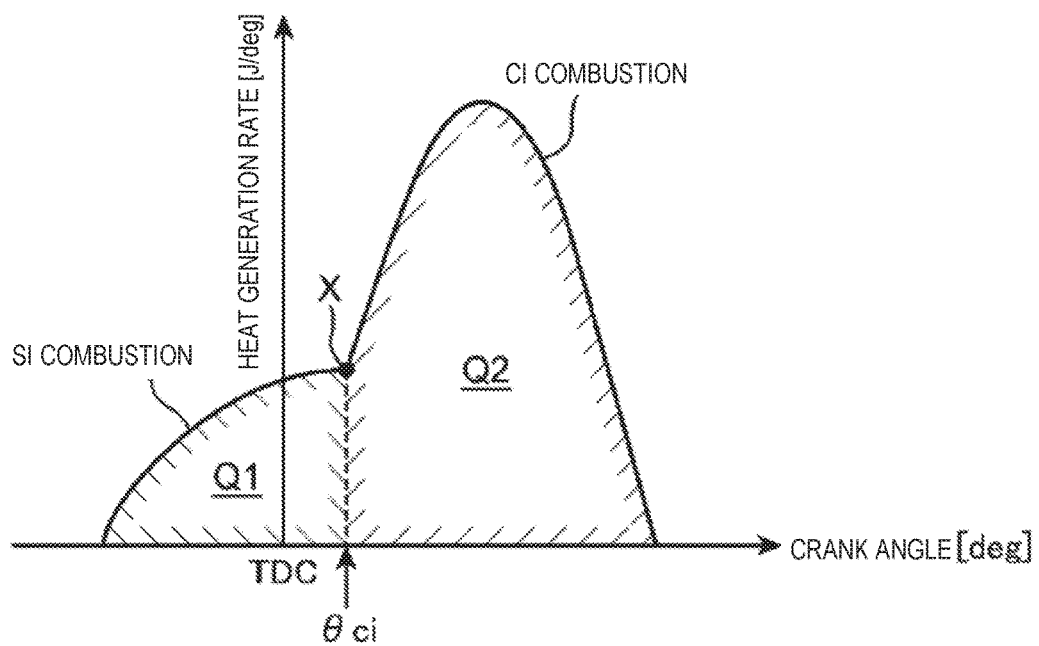
FIG. 7 is a chart illustrating a waveform of a heat generation rate in SPCCI combustion (partial compression-ignition combustion).

In the SPCCI combustion, the heat generation in the SI combustion becomes slower than the heat generation in the CI combustion. For example, as illustrated in FIG. 6 or 7 described later, a waveform of a heat generation rate when the SPCCI combustion is performed has a relatively gentle rising slope. Moreover, a pressure variation (i.e., $dP/d\theta$: P is the in-cylinder pressure and $\theta$ is the crank angle) in the combustion chamber 6 is gentler in the SI combustion than in the CI combustion. In other words, the waveform of the heat generation rate in the SPCCI combustion is formed to have a first heat generation rate portion formed by the SI combustion and having a relatively gentle rising slope, and a second heat generation rate portion formed by the CI combustion and having a relatively sharp rising slope, which are next to each other in this order.

When the temperature and pressure inside the combustion chamber 6 rise due to the SI combustion, the unburned mixture gas self-ignites and the CI combustion starts. As illustrated in FIG. 6 or 7 described later, the slope of the waveform of the heat generation rate changes from gentle to sharp at the timing of self-ignition (that is, the timing when the CI combustion starts). That is, the waveform of the heat generation rate in the SPCCI combustion has a flexion point at a timing when the CI combustion starts (X in FIG. 7).

After the CI combustion starts, the SI combustion and the CI combustion are performed in parallel. In the CI combustion, since the heat generation is larger than in the SI combustion, the heat generation rate becomes relatively high. However, since the CI combustion is performed after TDC of compression stroke (CTDC), the slope of the waveform of the heat generation rate does not become excessive. That is, after CTDC, since the motoring pressure decreases due to the descending of the piston 5, the heat generation rate is prevented from rising, which avoids excessive $dp/d\theta$ in the CI combustion. In the SPCCI combustion, due to the CI combustion being performed after the SI combustion as described above, it is unlikely for $dp/d\theta$, which is an index of combustion noise, to become excessive, and the combustion noise is reduced compared to simply performing the CI combustion (in the case where the CI combustion is performed on all the fuel).

The SPCCI combustion ends due to finishing the CI combustion. Since the combustion speed of the CI combustion is faster than that of the SI combustion, the combustion end timing is advanced compared to simply performing the SI combustion (when the SI combustion is performed on all the fuel). In other words, the SPCCI combustion brings the combustion end timing on the expansion stroke closer to CTDC. Thus, the SPCCI combustion improves the fuel efficiency compared to the simple SI combustion.

In order to achieve the SPCCI combustion as described above, within the first operating range A1, the various components of the engine are controlled by the ECU 100 as follows.

The injector 15 injects all or majority of the fuel for one combustion cycle, during the compression stroke. For example, at an operation point P1 included in the first operating range A1, the injector 15 injects the fuel separately at two times from an intermediate stage to a final stage of the compression stroke, as illustrated in the chart (a) of FIG. 6.

The spark plug 16 ignites the mixture gas near CTDC. For example, at the operation point P1, the spark plug 16 ignites the mixture gas at a slightly advanced timing from CTDC. This ignition triggers the SPCCI combustion to start, a portion of the mixture gas in the combustion chamber 6 is combusted through flame propagation (SI combustion), and then the rest of the mixture gas is combusted by self-ignition (CI combustion).

The booster 33 is turned off. That is, the electromagnetic clutch 34 is disengaged to disconnect the booster 33 from the engine body 1 and fully open the bypass valve 39 so as to stop boosting by the booster 33.

The intake VVT 13a and the exhaust VVT 14a set valve operation timings of the intake and exhaust valves 11 and 12 so that the internal EGR is performed, i.e., the valve overlap period in which both the intake and exhaust valves 11 and 12 are opened over TDC of the exhaust stroke is sufficiently formed. As a result, the internal EGR which leaves the burned gas in the combustion chamber 6 is achieved, and the temperature of the combustion chamber 6 (the initial temperature before the compression) is increased.

The throttle valve 32 is fully opened.

An opening of the EGR valve 53 is controlled so that an air-fuel ratio (A/F), which is a mass ratio between air (fresh air) in the combustion chamber 6 and the fuel, becomes a given target air-fuel ratio. For example, the target air-fuel ratio in the first operating range A1 is set leaner ($\lambda>1$) than a stoichiometric air-fuel ratio on the lower load side of a load line L illustrated in FIG. 5, and set to or near the stoichiometric air-fuel ratio ($\lambda\approx1$) on the higher load side of the load line L. Note that $\lambda$ is an excess air ratio. $\lambda=1$ is established when the air-fuel ratio is the stoichiometric air-fuel ratio (14.7:1), and $\lambda>1$ is established when the air-fuel ratio is leaner than the stoichiometric air-fuel ratio. The EGR valve 53 adjusts an amount of the exhaust gas recirculated through the EGR passage 51 (external EGR gas) so that the amount of air (fresh air) corresponding to the target air-fuel ratio described above is introduced into the combustion chamber 6. In other words, the EGR valve 53 adjusts the flow rate in the EGR passage 51 so as to recirculate from the EGR passage 51 to the combustion chamber 6, an amount of gas obtained by subtracting the air amount corresponding to the target air-fuel ratio and the amount of burned gas left in the combustion chamber 6 due to the internal EGR from a total gas amount introduced into the combustion chamber 6 when the throttle valve 32 is fully opened, as external EGR gas. Within the first operating range A1, the air-fuel ratio (A/F) is set to or leaner than the stoichiometric air-fuel ratio as described above, and also the EGR gas (external EGR gas and internal EGR gas) is introduced into the combustion chamber 6. Therefore, a gas/fuel ratio (G/F) which is a mass ratio of the total gas to the fuel in the combustion chamber 6 is lean over the entire first operating range A1.

The opening of the swirl valve 18 is in the fully closed state or narrowed to a small opening close to the fully closed state. As a result, all or majority of the intake air introduced into the combustion chamber 6 is from the first intake port 9A (the intake port on the side where the swirl valve 18 is not provided), thus a strong swirl flow is formed inside the combustion chamber 6. This swirl flow grows during the intake stroke and remains until the middle of the compression stroke. Therefore, for example, when the fuel is injected during the compression stroke as at the operating point P1 described above, stratification of the fuel is achieved by the effect of the swirl flow. That is, when the fuel is injected after the intermediate stage of the compression stroke in the presence of the swirl flow, the injected fuel is collected in a center portion of the combustion chamber 6 where the swirl flow is relatively weak. Thus, such concentration difference that the fuel in the center portion of the combustion chamber 6 concentrates more than outside thereof (outer circumferential portion) occurs, and the stratification of the fuel is achieved. For example, the air-fuel ratio in the center portion of the combustion chamber 6 is set to between 20:1 and 30:1 and the air-fuel ratio in the outer circumference portion of the combustion chamber 6 is set to 35:1 or above.

(b) Second Operating Range

Within the second operating range A2 (the range combined the low-speed medium-load range and the medium speed range), a control is executed in which the booster 33 performs boosting and the SPCCI combustion of the mixture gas is performed. For example, in order to achieve the SPCCI combustion accompanied by such boosting, within the second operating range A2, various components of the engine are controlled by the ECU 100 as follows.

The injector 15 injects a portion of the fuel to be injected in one combustion cycle during the intake stroke, and injects the rest of the fuel on the compression stroke. For example, as illustrated in the chart (b) of FIG. 6, at an operation point P2 included in the second operating range A2, the injector 15 performs a first (first-time) fuel injection in which a relatively large amount of fuel is injected during the intake stroke and performs a second (second-time) fuel injection in which a smaller amount of fuel than the first fuel injection is injected during the compression stroke. Further, at an operation point P3 on a higher load and higher speed than the operation point P2, the injector 15 injects the fuel for a continuous period from the intake stroke to the compression stroke as illustrated in chart (c) of FIG. 6.

The spark plug 16 ignites the mixture gas near CTDC. For example, at the operation point P2, the spark plug 16 ignites the mixture gas at a timing slightly advanced from CTDC (chart (b) of FIG. 6), and at the operation point P3, at a timing slightly retarded from CTDC (chart (c) in FIG. 6). This ignition triggers the SPCCI combustion, a portion of the mixture gas in the combustion chamber 6 is combusted through flame propagation (SI combustion), and then the rest of the mixture gas is combusted by self-ignition (CI combustion).

The booster 33 is turned on. That is, the electromagnetic clutch 34 is engaged to connect the booster 33 to the engine body 1 to perform the boosting by the booster 33. Here, the opening of the bypass valve 39 is controlled so that the pressure in the surge tank 36 (boosting pressure) detected by the second intake air pressure sensor SN7 matches given target pressure determined for each operating condition (engine speed and engine load). For example, as the opening of the bypass valve 39 increases, the flow rate of the intake air which flows back to the upstream side of the booster 33 through the bypass passage 38 increases, and as a result, the pressure of the intake air introduced into the surge tank 36, that is, the boost pressure, becomes low. By adjusting the backflow amount of the intake air in this manner, the bypass valve 39 controls the boosting pressure to the target pressure.

The intake VVT 13*a* and the exhaust VVT 14*a* control the valve operation timings of the intake and exhaust valves 11 and 12 so that the internal EGR is performed only in a low load segment of the second operating range A2 (i.e., the internal EGR is stopped in a high load segment).

The throttle valve 32 is fully opened.

The opening of the EGR valve 53 is controlled so that the air-fuel ratio (A/F) inside the combustion chamber 6 becomes the given target air-fuel ratio. For example, the target air-fuel ratio in the second operating range A2 is set leaner ($\lambda > 1$) than the stoichiometric air-fuel ratio on the lower load side of the load line L (FIG. 5), and set to or near the stoichiometric air-fuel ratio ($\lambda \approx 1$) on the higher load side of the load line L. The EGR valve 53 adjusts the external EGR gas so that the amount of air (fresh air) corresponding to the target air-fuel ratio is introduced into the combustion chamber 6. For example, the recirculation amount of the exhaust gas is reduced to be smaller as the engine load increases, and becomes substantially zero near a highest load of the engine. In other words, the gas/fuel ratio (G/F) in the combustion chamber 6 is set lean except for near the highest load of the engine.

The swirl valve 18 is fully closed or opened at a suitable intermediate opening which is not fully closed/opened. For example, the swirl valve 18 is fully closed in the low load segment of the second operating range A2, and is adjusted to have the intermediate opening in the rest of the range A2. Note that the opening of the swirl valve 18 in the rest of the range A2 is increased as the load is increased.

(c) Third Operating Range

Within the third operating range A3 on the low-speed, high-load side, a control is executed in which the booster 33 performs boosting and the SI combustion of the mixture gas is performed. For example, in order to achieve the SI combustion accompanied by such boosting, within the third operating range A3, the various components of the engine are controlled by the ECU 100 as follows.

The injector 15 injects during the intake stroke a portion of the fuel for one combustion cycle, and injects the rest of the fuel on the compression stroke. For example, as illustrated in the chart (d) of FIG. 6, at an operation point P4 included in the third operating range A3, the injector 15 performs the first fuel injection in which a relatively large amount of fuel is injected during the intake stroke and performs the second fuel injection in which a smaller amount of fuel than the first fuel injection is injected in the final stage of the compression stroke (immediately before CTDC).

The spark plug 16 ignites the mixture gas at a relatively retarded timing, for example 5° CA to 20° CA from CTDC. Further, this ignition triggers the SI combustion, and all the mixture gas in the combustion chamber 6 combusts through flame propagation. Note that the reason why the ignition timing within the third operating range A3 is retarded as described above is to prevent abnormal combustion, such as knocking and pre-ignition. However, within the third operating range A3, the second fuel injection is set to be performed in the final stage of the compression stroke (immediately before CTDC), which is considerably late, therefore, even with the ignition timing retarded as described above, the combustion speed after the ignition (flame propagation speed) is relatively fast. That is, since the period from the second fuel injection to the ignition is sufficiently short, the flow (turbulence kinetic energy) in the combustion chamber 6 at the ignition timing becomes relatively strong, and the combustion speed after the ignition is accelerated using this flow. Thus, the thermal efficiency is kept high while preventing the abnormal combustion.

The booster 33 is turned on. That is, the electromagnetic clutch 34 is engaged to connect the booster 33 to the engine body 1 so as to perform the boosting by the booster 33. Further, the opening of the bypass valve 39 is controlled so that the pressure in the surge tank 36 (boosting pressure) matches the target pressure.

The throttle valve 32 is fully opened.

The opening of the EGR valve 53 is controlled so that the air-fuel ratio (A/F) in the combustion chamber 6 becomes the stoichiometric air-fuel ratio or slightly richer. On the other hand, the gas/fuel ratio (G/F) in the combustion chamber 6 is set lean except for near the highest load of the engine.

The opening of the swirl valve 18 is set to or near a given intermediate opening (e.g., 50%).

(d) Fourth Operating Range

Within the fourth opening range A4 on the higher speed side of the first to third operating ranges A1 to A3, relatively general SI combustion is executed. In order to achieve this SI combustion, within the fourth operating range A4, the various components of the engine are controlled by the ECU 100 as follows.

The injector 15 at least injects the fuel over a given period overlapping with the intake stroke. For example, at an operation point P5 included in the fourth operating range A4, the injector 15 injects the fuel over a continuous period from the intake stroke to the compression stroke, as illustrated in the chart (e) of FIG. 6. Note that since the operation point P5 is in a considerably high-speed and high-load condition, the amount of fuel to be injected in one combustion cycle is large and also a crank angle period required for injecting the required amount of fuel becomes long, which is why the fuel injection period at the operation point P5 is longer than the other operation points (P1 to P4) described above.

The spark plug 16 ignites the mixture gas near CTDC. For example, at the operation point P5, the spark plug 16 ignites the mixture gas at a slightly advanced timing from CTDC. Further, this ignition triggers the SI combustion, and all the mixture gas in the combustion chamber 6 combusts through flame propagation.

The booster 33 is turned on. That is, the electromagnetic clutch 34 is engaged to connect the booster 33 to the engine body 1 so as to perform the boosting by the booster 33. Further, the opening of the bypass valve 39 is controlled so that the pressure in the surge tank 36 (boosting pressure) matches the target pressure.

The throttle valve 32 is fully opened.

The opening of the EGR valve 53 is controlled so that the air-fuel ratio (A/F) in the combustion chamber 6 becomes the stoichiometric air-fuel ratio or slightly richer. On the other hand, the gas/fuel ratio (G/F) in the combustion chamber 6 is set lean except for near the highest load of the engine.

The swirl valve 18 is fully opened. Thus, not only the first intake port 9A but also the second intake port 9B are fully opened and charging efficiency of the engine is improved.

(4) About SI Ratio

As described above, in this embodiment the SPCCI combustion combined the SI combustion and the CI combustion is performed within the first and second operating ranges A1 and A2. In this SPCCI combustion, it is important to control the ratio of the SI combustion with the CI combustion according to the operating condition.

In this embodiment, as the ratio, an SI ratio which is a ratio of a heat generation amount by the SI combustion to the total heat generation amount by the SPCCI combustion (the SI combustion and the CI combustion) is used. FIG. 7 is a chart illustrating this SI ratio and illustrating a change in heat generation rate (J/deg) according to the crank angle when the SPCCI combustion occurs. The flection point X in the waveform of FIG. 7 is a flection point appearing when the combustion mode switches from the SI combustion to the CI combustion and the crank angle θci corresponding to this flection point X may be defined as the start timing of CI combustion. Further, an area Q1 of the waveform of the heat generation rate located on the advance side of this θci (the start timing of CI combustion) is set as the heat generation amount by the SI combustion, and an area Q2 of the waveform of the heat generation rate located on the retarding side of θci is the heat generation rate by the CI combustion. Thus, the SI ratio defined by (heat generation amount by SI combustion)/(heat generation amount by SPCCI combustion) may be expressed by Q1/(Q1+Q2) using the respective areas Q1 and Q2. That is, in this embodiment, the SI ratio=Q1/(Q1+Q2).

In the case of CI combustion, since the mixture gas combusts a plurality of times simultaneously by self-ignition, the heat generation rate easily increases compared to the SI combustion which is caused by flame propagation, and loud noise easily occurs. Therefore, as a whole, the SI ratio (=Q1/(Q1+Q2)) in the SPCCI combustion is desirably increased as the engine load increases. This is because, when the load is high, the fuel injection amount is large and the total heat generation amount in the combustion chamber 6 is larger compared to when the load is low, and therefore, loud noise is generated if the SI ratio is reduced (that is, the proportion of CI combustion is increased). Conversely, the CI combustion is excellent in terms of thermal efficiency. Therefore, it is preferable to apply the CI combustion to the largest fuel amount possible unless the noise becomes an issue. Therefore, as a whole, the SI ratio in the SPCCI combustion is desirably reduced as the engine load decreases (i.e., the proportion of the CI combustion is increased). In view of these points, in this embodiment, the SI ratio aimed for (target SI ratio) is determined in advance according to the operating condition of the engine, and target values of control amounts, such as the ignition timing, the fuel injection amount and timing, and in-cylinder state functions, are respectively determined to achieve this target SI ratio. Note that the in-cylinder state functions referred to here include, for example, the temperature in the combustion chamber 6 and the EGR ratio. The EGR ratio includes an external EGR ratio which is a ratio of the external EGR gas (exhaust gas recirculated to the combustion chamber 6 through the EGR passage 51) to all the gas in the combustion chamber 6, and an internal EGR ratio (burned gas remaining in the combustion chamber 6) which is a ratio of the internal EGR gas to all the gas in the combustion chamber 6.

For example, as the ignition timing is advanced, a larger amount of fuel is combusted in the SI combustion, and the SI ratio increases. Further, as the injection timing of the fuel is advanced, a larger amount of fuel is combusted in the CI combustion, and the SI ratio decreases. Alternatively, as the temperature of the combustion chamber 6 rises, a larger amount of fuel is combusted in the CI combustion, and the SI ratio decreases.

Based on such a tendency, in this embodiment, the target values of the ignition timing, the fuel injection amount and timing, and the in-cylinder state functions (temperature, EGR ratio, etc.) are determined in advance for each operating state so as to achieve a combination of values achievable of the target SI ratio described above. In the operation with the SPCCI combustion (i.e., in the operation within the first and second operating ranges A1 and A2), the ECU 100 controls the injector 15, the spark plug 16, the EGR valve 53, the intake and exhaust VVTs 13a and 14a, etc. based on the target values of these control amounts. For example, the spark plug 16 is controlled based on the target value of the ignition timing and the injector 15 is controlled based on the target values of the fuel injection amount and timing. Further, the EGR valve 53 and the intake and exhaust VVTs 13a and 14a are controlled based on the respective target values of the temperature of the combustion chamber 6 and the EGR ratio, and the recirculation amount of exhaust gas (external EGR gas) through the EGR passage 51 and the residual amount of burned gas (internal EGR gas) by the internal EGR is adjusted.

Note that in this embodiment in which the target SI ratio is determined in advance for each operating condition of the engine, the start timing θci of the CI combustion when the combustion conforming to this target SI ratio is performed is also naturally determined. In the following description, the start timing of CI combustion determined based on the target SI ratio is referred to as standard θci. This standard θci serves as a reference for determining the target θci in a flowchart (S4 in FIG. 8) described later.

(5) Control According to Knock Index Value

Here, in the SPCCI combustion combined the SI combustion and the CI combustion, knocking due to the respective SI combustion and CI combustion may occur. When knocking caused by the SI combustion is SI knock and knocking caused by the CI combustion is CI knock, SI knock means a phenomenon in which the unburned gas outside the area where the SI combustion of the mixture gas occurs combusts rapidly by abnormal local self-ignition (local self-ignition which is clearly different from normal CI combustion), and CI knock is a phenomenon in which main components of the engine (cylinder block/head, piston, crank journal part, etc.) resonate due to a pressure fluctuation by the CI combustion. The SI knock occurs as loud noise at a frequency of approximately 6.3 kHz due to vibration of air column inside the combustion chamber 6 occurring by the local self-ignition. On the other hand, the CI knock occurs as loud noise at a frequency within a range of approximately 1 to 4 kHz (more specifically, a plurality of frequencies included in this range) due to the resonance of the main components of the engine. Thus, the SI knock and the CI knock occur as noises at different frequencies caused by different reasons, and the frequency of the noise in the CI knock is lower than the frequency of the noise in the SI knock.

Since such SI knock and CI knock are both detected as harsh noise to a person in a cabin, the SPCCI combustion is controlled so that neither of the SI knock and the CI knock does not occur. Therefore, in this embodiment, an SI knock index value (combustion noise index value) correlated with the SI knock and a CI knock index value (combustion noise index value) correlated with the CI knock are specified based on the detection value of the in-cylinder pressure sensor SN2, and controls the SPCCI combustion based on each specified knock index value. Note that in this embodiment, the SI knock index value is a value representing noise around 6.3 kHz which increases due to the occurrence of the SI knock. The CI knock index value is a value representing noise around 1 to 4 kHz which increases due to the occurrence of the CI knock. As will be described later in detail, each of these knock index values is calculated by performing a Fourier transform on a detected waveform by the in-cylinder pressure sensor SN2.

Figure 8:
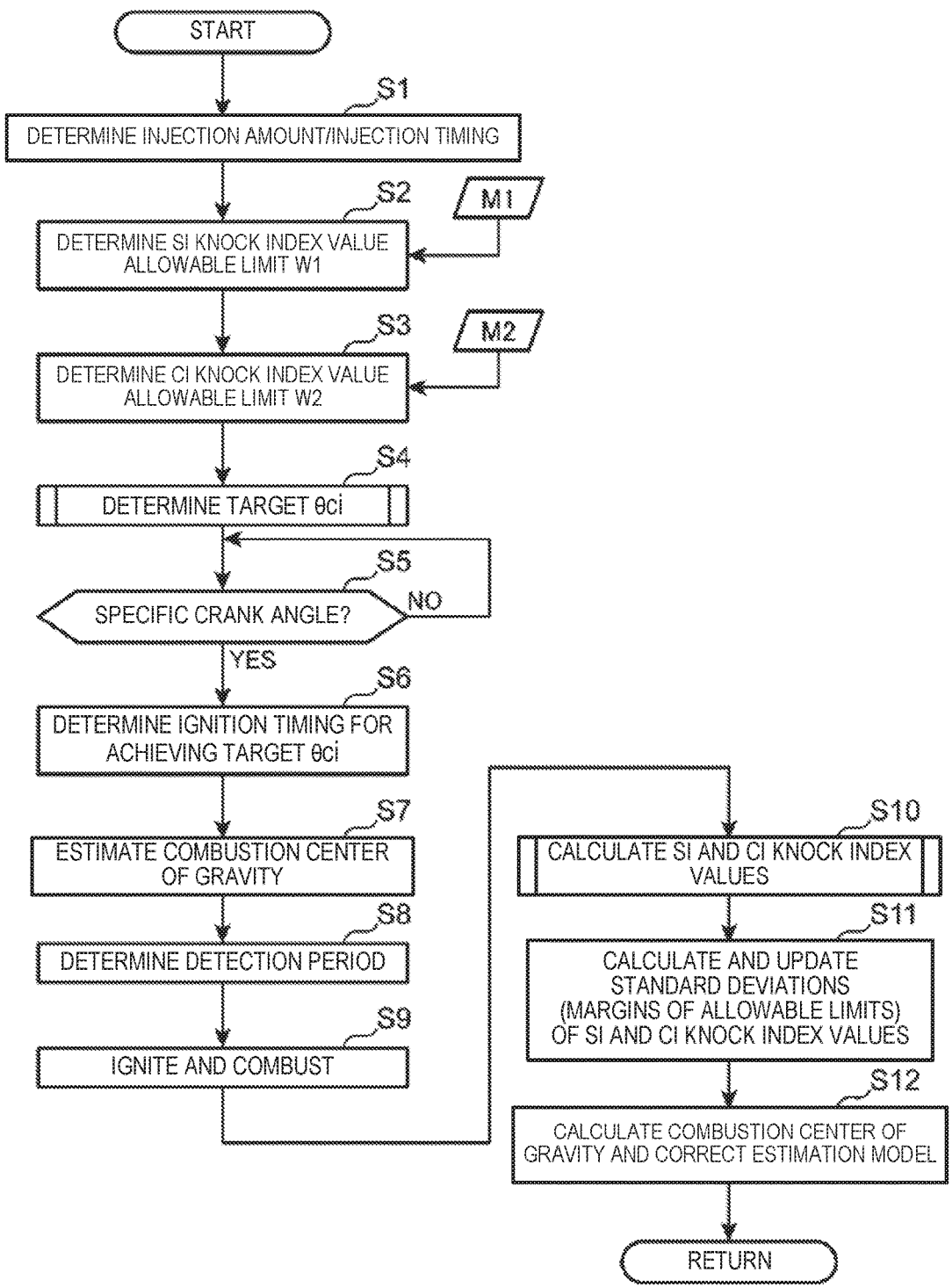
FIG. 8 is a flowchart illustrating a specific flow of a control executed in the SPCCI combustion.

FIG. 8 is a flowchart illustrating a specific procedure of the control executed by the ECU 100 in the SPCCI combustion, that is, in the operation within the first and second operating ranges A1 and A2 illustrated in FIG. 5. When the control illustrated in this flowchart starts, the ECU 100 determines the fuel injection amount from the injector 15 and its injection timing based on the engine speed detected by the crank angle sensor SN1 and the engine load which is specified by the detection value of the accelerator sensor SN9 (accelerator opening), the detection value of the airflow sensor SN3 (intake flow rate), etc. (S1). Note that as described in Section (4) above, in this embodiment, the target SI ratio is determined in advance according to the operating condition of the engine, and the fuel injection amount and timing for achieving this target SI ratio is determined in advance for each operating condition of the engine. The fuel injection amount and timing determined at S1 is the injection amount and timing for achieving this target SI ratio.

Next, the ECU 100 determines an allowable limit W1 which is an upper limit of the SI knock index value allowable under a current operating condition (FIG. 11A) (S2), and determines an allowable limit W2 which is an upper limit of the CI knock index value also allowable under the current operating condition (FIG. 11B) (S3).

Figure 11A:
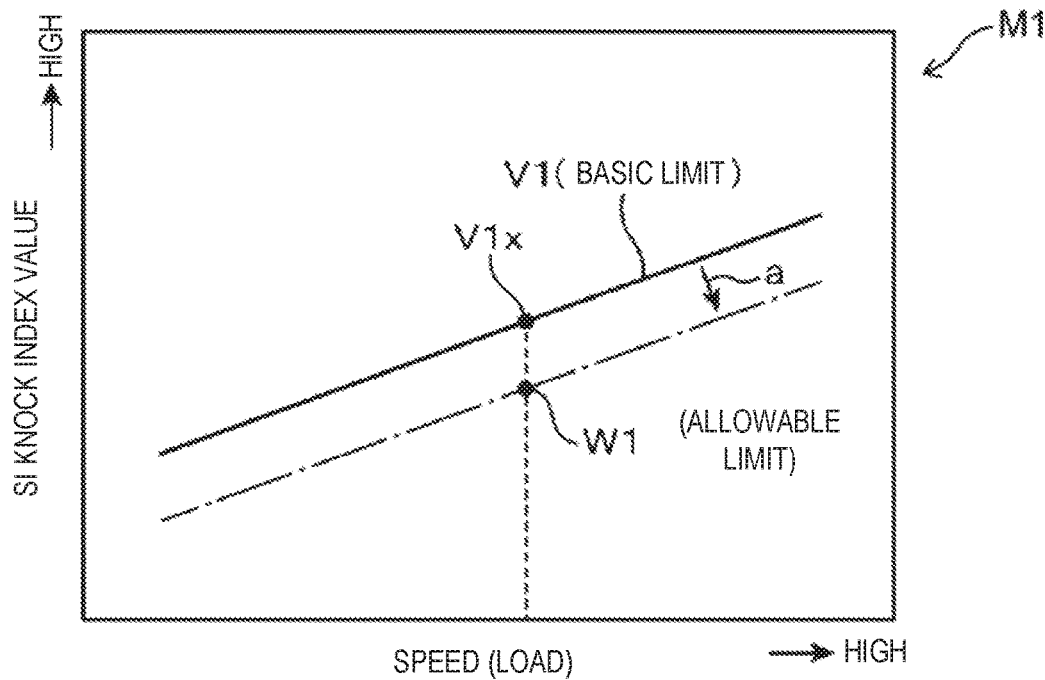

Specifically, at S2, the ECU 100 specifies the allowable limit W1 of the SI knock index value based on the engine speed detected by the crank angle sensor SN1 the engine load specified based on the detection value of the accelerator sensor SN9 (accelerator opening), etc., and a map M1 illustrated in FIG. 11A. Similarly, at S3, the ECU 100 specifies the allowable limit W2 of the CI knock index value based on the engine speed and load and the map M2 illustrated in FIG. 11B.

Figure 11B:
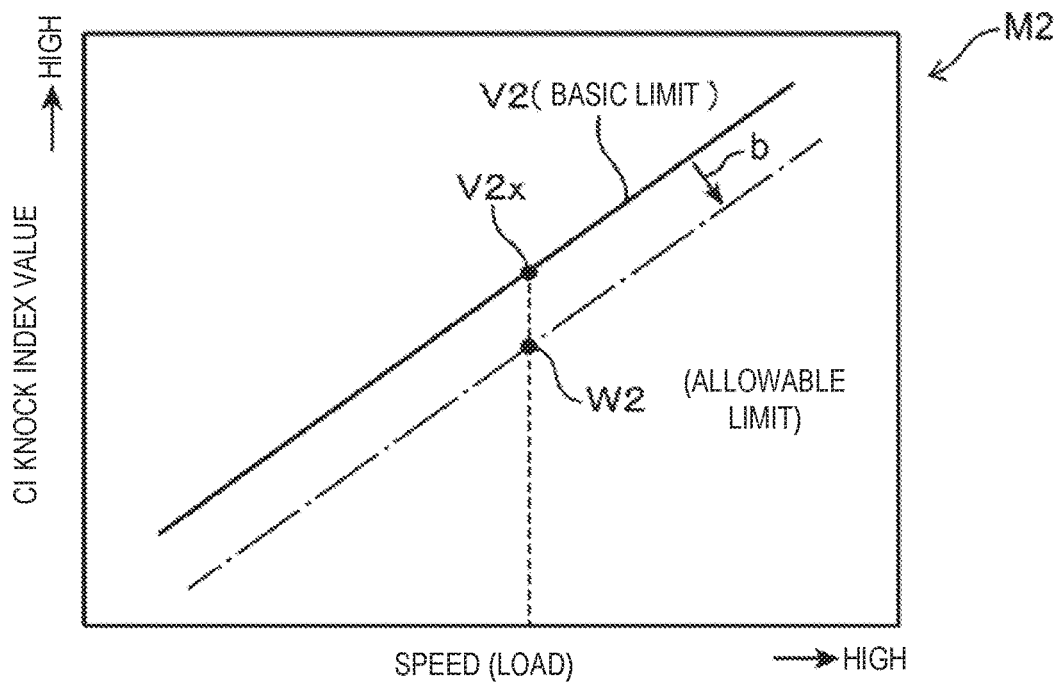

The map M1 of FIG. 11A is a map defining a basic limit (reference limit) V1 of the SI knock index value for each engine speed and load, and the map M2 of FIG. 11B is a map defining a basic limit (reference limit) V2 of the CI knock index value for each engine speed and load. These maps M1 and M2 are stored in advance in the ECU 100. In each of the maps M1 and M2, the basic limits V1 and V2 of the SI and CI knock index values are determined so as to become larger as the engine speed and load become higher. That is, each of the basic limits V1 and V2 increases when either of the engine speed and load is increased, takes a lowest value under the low-speed low-load condition in which the engine speed and load are both low, and takes a highest value under the high-speed high-load condition in which the engine speed and the engine load are both high. This is because it becomes easier to detect small noise, when the engine speed and load are lower (in other words, it becomes more difficult to detect large noise, as the engine speed and load increase).

At S2 and S3, the ECU 100 specifies the basic limit V1$x$ of the SI knock index value and the basic limit V2$x$ of the CI knock index value corresponding to the current operating condition by comparing to the maps M1 and M2 of FIGS. 11A and 11B to the current engine operating condition (speed and load) specified based on the detection values of the sensors SN1 and SN9 etc.

Margins "a" and "b" are obtained based on variations of the SI and CI knock index values acquired previously, respectively. These margins a and b are subtracted from the basic limits V1$x$ and V2$x$, and the obtained values are determined as the allowable limits W1 and W2 of the SI and CI knock index values, respectively. That is, the basic limit V1$x$ of the SI knock index value corresponding to the current operating condition is specified using the map M1 (FIG. 11A) and the value obtained by subtracting the margin a, which is based on the variation of the SI knock index value acquired previously, from the basic limit V1$x$, is determined as the allowable limit W1 of the SI knock index value. Similarly, the basic limit V2$x$ of the CI knock index value corresponding to the current operating condition is specified using the map M2 (FIG. 11B) and the value obtained by subtracting the margin b, which is based on the variation of the CI knock index value acquired previously, from the basic limit V2$x$, is determined as the allowable limit W2 of the CI knock index value.

Here, the margins a and b to be subtracted from the basic limits V1$x$ and V2$x$ in the above process respectively are obtained from the history of the previously-acquired SI and CI knock index values (S11 described later).

Figure 12:
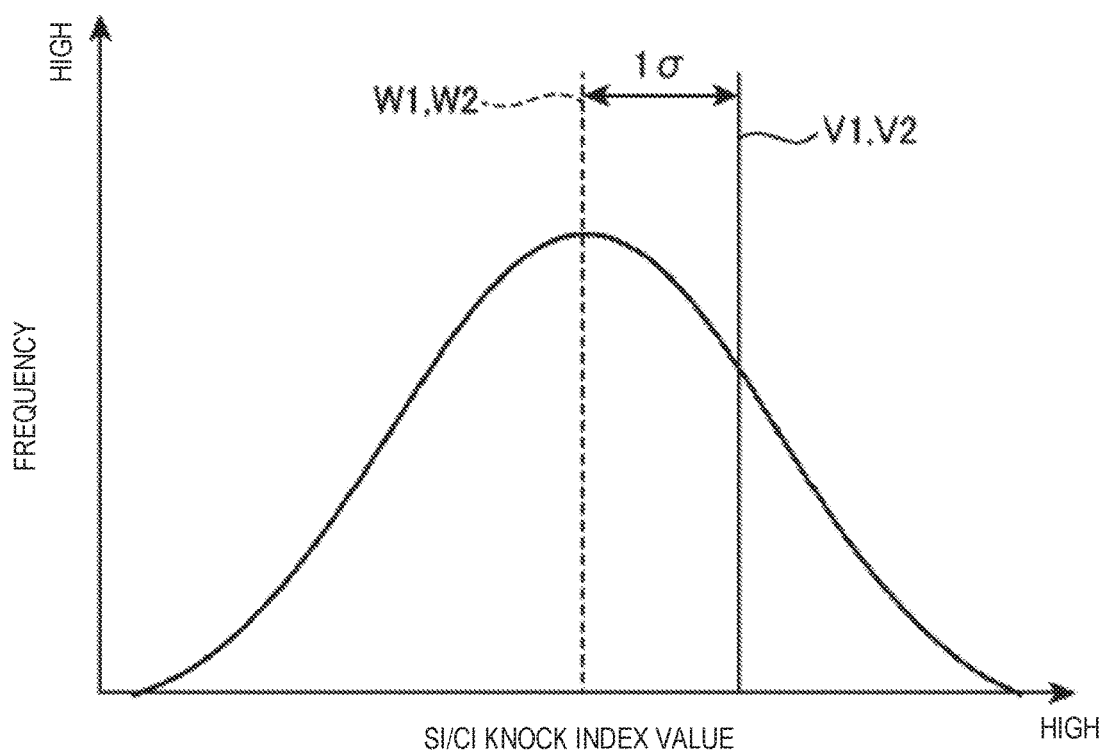
FIG. 12 is a chart illustrating a relationship of the SI and CI knock index values with their respective frequencies.

In this embodiment, a standard deviation among a plurality of SI knock index values (CI knock index values) at a plurality of time points corresponding to a given period of time in the past being accumulated, i.e., a value of so-called 1σ (1 sigma), is used as the margin a (margin b). That is, in FIG. 12 illustrating a relationship of the SI and CI knock index values with their frequencies, a value which is smaller than the basic limit V1$x$ (V2$x$) by the standard deviation (1σ) of the SI knock index value (CI knock index values) is determined as the allowable limit W1 (W2).

The allowable limits W1 and W2 are determined in consideration of the variations in the SI and CI knock index values as described above because, if the allowable value of the knock index value is fixed in disregard of the variation in noise in each combustion cycle, a possibility that loud noise exceeding the allowable limit incidentally occurs becomes high. In other words, the allowable limits W1 and W2 are set in consideration of the variations in the above manner so as to ensure that combustion accompanied by loud noise exceeding the allowable limit does not occur in any combustion cycle regardless of the degree of the variation in the noise. In this embodiment, the margins a and b are set to a so-called 1σ (1 sigma) which is the standard deviations of the SI and CI knock index values, so that at least about 90% of the SI and CI knock index values do not exceed the basic limits V1$x$ and V2$x$, respectively.

Next, the ECU 100 determines the target θci which is the target start timing of CI combustion (S4). This target θci is a target value of the crank angle (the crank angle θci illustrated in FIG. 7) at which the SI combustion is switched to the CI combustion, and is determined so as to lower the SI and CI knock index values below the allowable limits W1 and W2.

Figure 9:
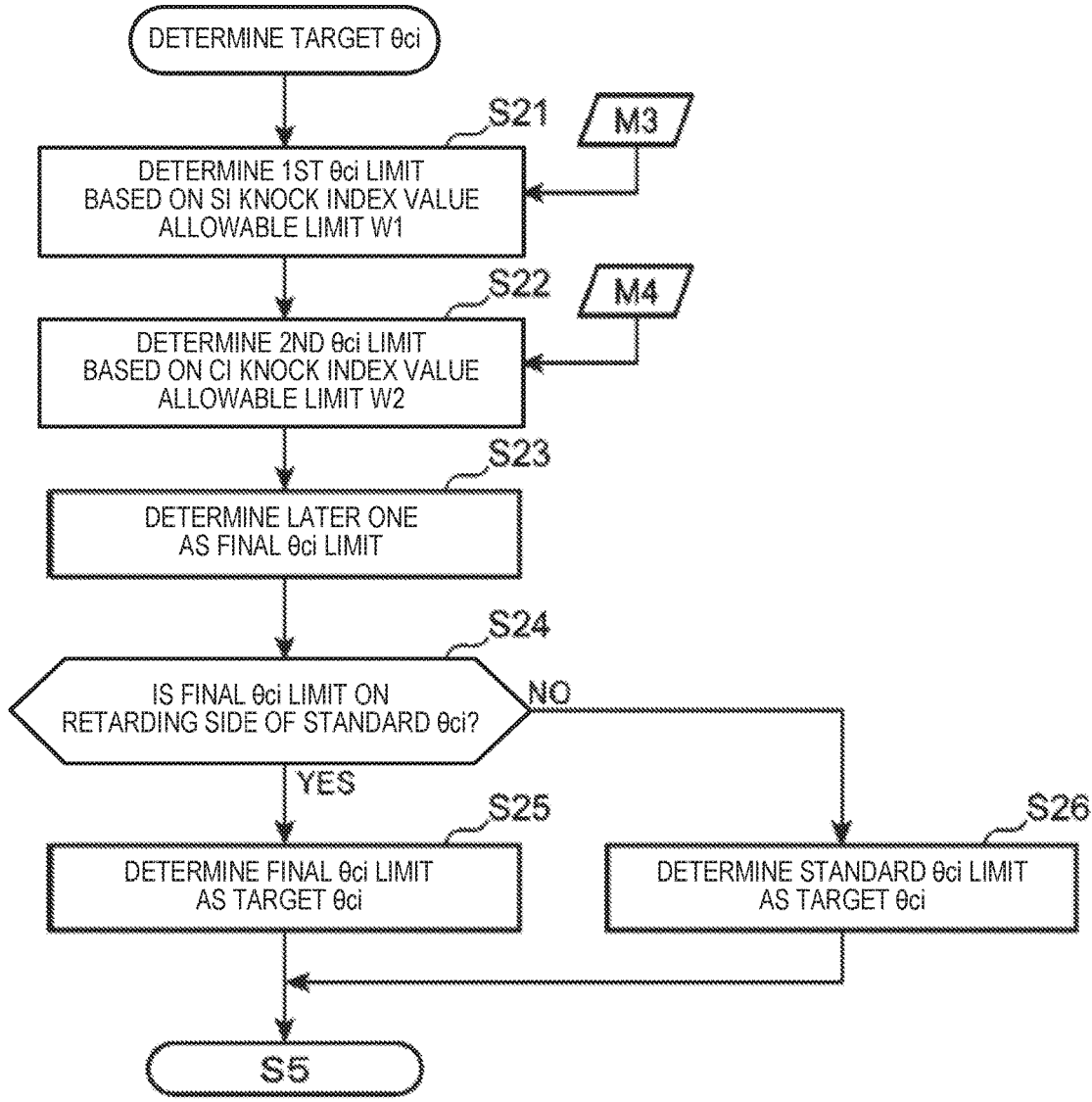
FIG. 9 is a subroutine illustrating a specific flow of a control at S4 of FIG. 8.

FIG. 9 is a subroutine illustrating a specific flow of a control at S4 at which the target θci is determined. Once the control in this subroutine is started, the ECU 100 determines a first θci limit which is a limit of the start timing of the CI combustion by which the SI knock index value is kept below the allowable limit W1, based on the engine speed detected by the crank angle sensor S1, the engine load specified based on the detection value of the accelerator sensor SN9 etc., the allowable limit W1 of the SI knock index value determined at S2, and a map M3 illustrated in FIG. 13A (S21). Similarly, the ECU 100 determines a second θci limit which is a limit of the start timing of the CI combustion by which the CI knock index value is kept below the allowable limit W2, based on the engine speed and load, the allowable limit W2 of the CI knock index value determined at S3, and a map M4 illustrated in FIG. 13B (S22).

Figures 13A, 13B:
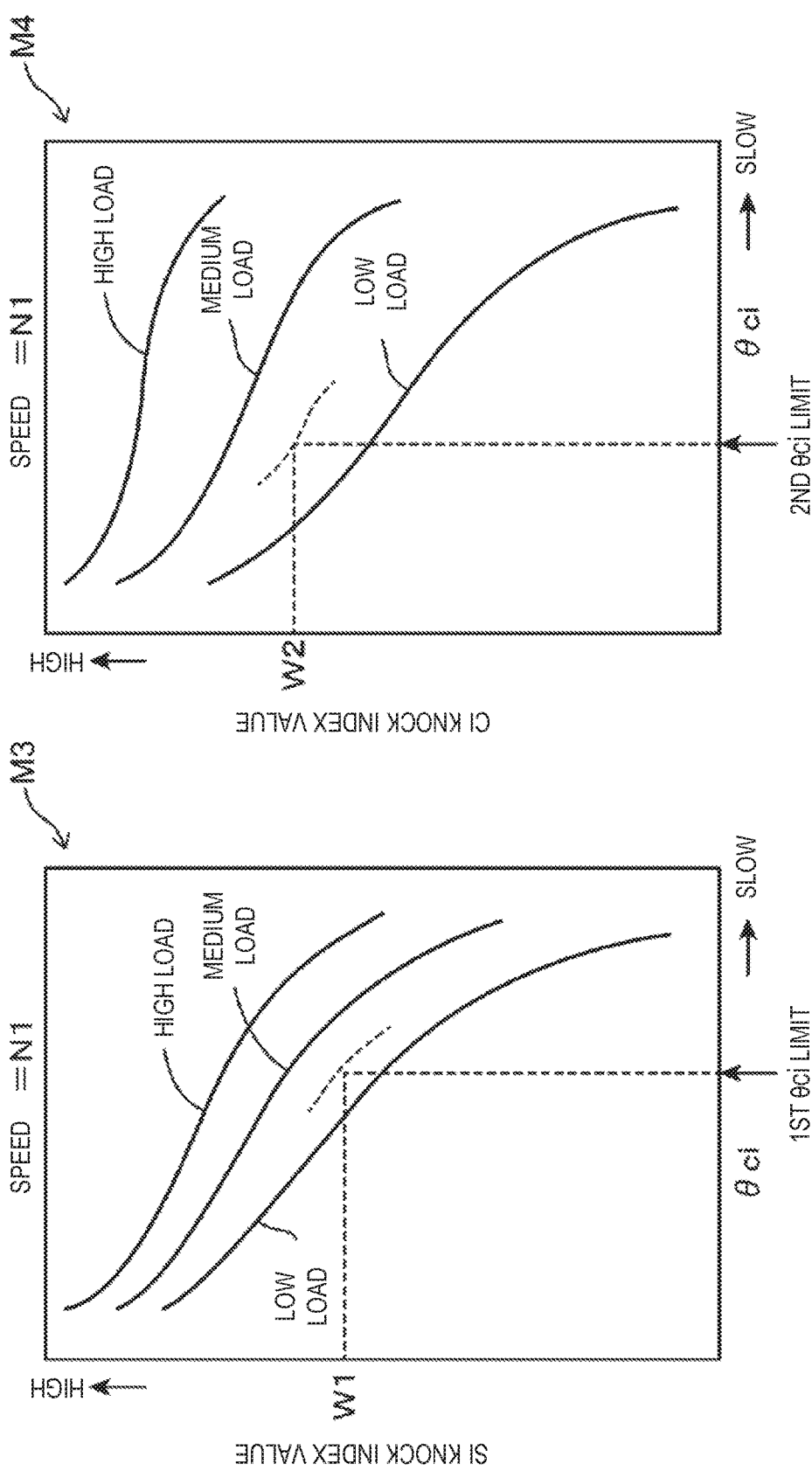

The map M3 of FIG. 13A is a map defining a standard relationship between θci (start timing of CI combustion) and the SI knock index value, and corresponds to a "first characteristic" and a "characteristic." The map M4 of FIG. 13B is a map defining a standard relationship between θci and the CI knock index value, and corresponds to a "second characteristic" and the "characteristic." More specifically, the map M3 defines the standard characteristic of the SI knock index value obtained when the engine load is variously changed while keeping the engine speed (N1), and the horizontal axis indicates θci and the vertical axis indicates the SI knock index value (estimated value). Further, the map M4 defines the standard characteristic of the CI knock index value obtained when the engine load is variously changed while keeping the engine speed (N1), and the horizontal axis indicates θci and the vertical axis indicates the CI knock index value (estimated value). These maps M3 and M4 are stored in advance in the ECU 100. Note that although in FIGS. 13A and 13B only three types of loads—the low load, the medium load, and the high load—are illustrated for the sake of convenience, the characteristics other than the three types of loads are also included in the maps M3 and M4. Moreover, although the engine speed is fixed (N1) in the maps M3 and M4, maps like the maps M3 and M4 that are created for other various engine speeds are also stored in the ECU 100. When the engine speed/load is not specified in the map M3 and M4, the SI and CI knock index values may be estimated by, for example, linear interpolation. As described above, in this embodiment, when θci is changed under various conditions with different engine speeds/loads, how the SI and CI knock index values change accordingly is estimated using the maps M3 and M4 of FIGS. 13A and 13B.

At S21, the ECU 100 compares the allowable limit W1 of the SI knock index value determined at S2 with the map M3 in FIG. 13A to specify θci so that the SI knock index value matches with the allowable limit W1, and this θci is determined as the first θci limit described above. Similarly at S22, the ECU 100 compares the allowable limit W2 of the CI knock index value determined at S3 with the map M4 in FIG. 13B to specify θci so that the CI knock index value matches with the allowable limit W2, and this θci is determined as the second θci limit described above.

Next, the ECU 100 compares the first θci limit determined at S21 with the second θci limit determined at S22, and determines the later one of the two as a final θci limit (S23). Note that the first θci limit and the second θci limit may completely be the same in some cases, and in such a case, a value matching with both the first θci limit and the second θci limit is determined as the final θci limit.

Next, the ECU 100 determines whether the final θci limit determined at S23 is on the retarding side of a given standard θci (S24). Note that the standard θci used here is, as described in Section (4) above, the start timing of the CI combustion obtained when the combustion with the target SI ratio determined for each operating condition (in other words, targeted SPCCI combustion) is achieved.

If S24 is YES and it is confirmed that the final θci limit is on the retarding side of the standard θci, the ECU 100 determines the final θci limit as the target θci (S25).

On the other hand, if S24 is NO and it is confirmed that the final θci limit is not on the retarding side of the standard θci, in other words, the final θci limit is the same as or on the advancing side of the standard θci, the ECU 100 determines the standard θci as the target θci (S26).

Once the determination process of the target θci is thus completed, the ECU 100 determines whether the crank angle is at a specific angle based on the detection value of the crank angle sensor SN1 (S5). This specific crank angle is determined in advance as the timing for determining the ignition timing by the spark plug 16, for example, about 60° CA before CTDC.

If S5 is YES and the crank angle is confirmed to be at the specific angle, the ECU 100 determines an ignition timing for achieving the target θci determined at S4 (S6). Here, in this embodiment, for each operating condition of the engine, the target values of the target SI ratio, the standard θci corresponding to the target SI ratio, the ignition timing for achieving these target SI ratios and standard θci, the fuel injection amount, the fuel injection timing, and the in-cylinder state functions (temperature, EGR ratio, etc.) are determined in advance, and the ignition timing is determined based on these target values. For example, the ignition timing for achieving the target θci is determined based on a deviation of the standard θci from the target θci and the in-cylinder state functions at the specific crank angle timing.

That is, as the deviation of the standard θci from the target θci is larger, the ignition timing needs to be deviated greater from an initial target value of the ignition timing determined corresponding to the standard θci (hereinafter, referred to as "temporal ignition timing"). Further, as the in-cylinder state functions at the specific crank angle timing deviate greater from the target values, the ignition timing still needs to be deviated greater from the temporal ignition timing. On the other hand, as described at S1, in this embodiment, since the initial target values are adopted as they are as the fuel injection amount and the fuel injection timing, the deviations of the fuel injection amount and the fuel injection timing are not required to be taken into consideration. At S6, by using a given arithmetic expression prepared in advance in view of the above situation, the ignition timing of the spark plug 16 is determined based on the deviation of the standard θci from the target θci and the deviation of the in-cylinder state functions from the target value. The in-cylinder state functions, that is, the temperature of the combustion chamber 6, the EGR ratio, etc. may be estimated based on, for example, the detection values of the second intake air temperature sensor SN6, the second intake air pressure sensor SN7, the pressure difference sensor SN8, etc. Note that when the target θci is the same as the standard θci and the in-cylinder state functions at the specific crank angle timing is the same as the target value, the temporal ignition timing is adopted as the ignition timing as it is.

Next, the ECU 100 estimates a combustion center of gravity which is a timing when an amount of fuel corresponding to a half of the mass (50% mass) of the total fuel injected into the combustion chamber 6 in one combustion cycle combusts, based on the fuel injection amount and the fuel injection timing determined at S1, the ignition timing determined at S6, and the in-cylinder state functions, and the engine speed at the specific crank angle timing (S7). The estimation processing at S7 is performed based on an estimation model prepared in advance.

Next, the ECU 100 determines a given period including the combustion center of gravity estimated at S7 as a period in which the in-cylinder pressure for calculating the SI and CI knock index values at S10 described later is detected (S8). The period in which the in-cylinder pressure is detected (hereinafter, referred to as "detection period") is determined to be a finite and continuous period including the combustion center of gravity. The detection period may be a period set based on time, or may be a period set based on the crank angle. In the case of using the crank angle, for example, a period from the crank angle advancing by 40° CA from the combustion center of gravity to the crank angle retarding by 40° CA therefrom as the detection period (see FIG. 14 described later).

Next, the ECU 100 causes the spark plug 16 to ignite at the ignition timing determined at S6, so as to trigger the SPCCI combustion of the mixture gas (S9).

Next, the ECU 100 calculates the SI knock index value and the CI knock index value based on the waveform of the in-cylinder pressure detected by the in-cylinder pressure sensor SN2 during the detection period determined at S8 (S10).

Figure 10:
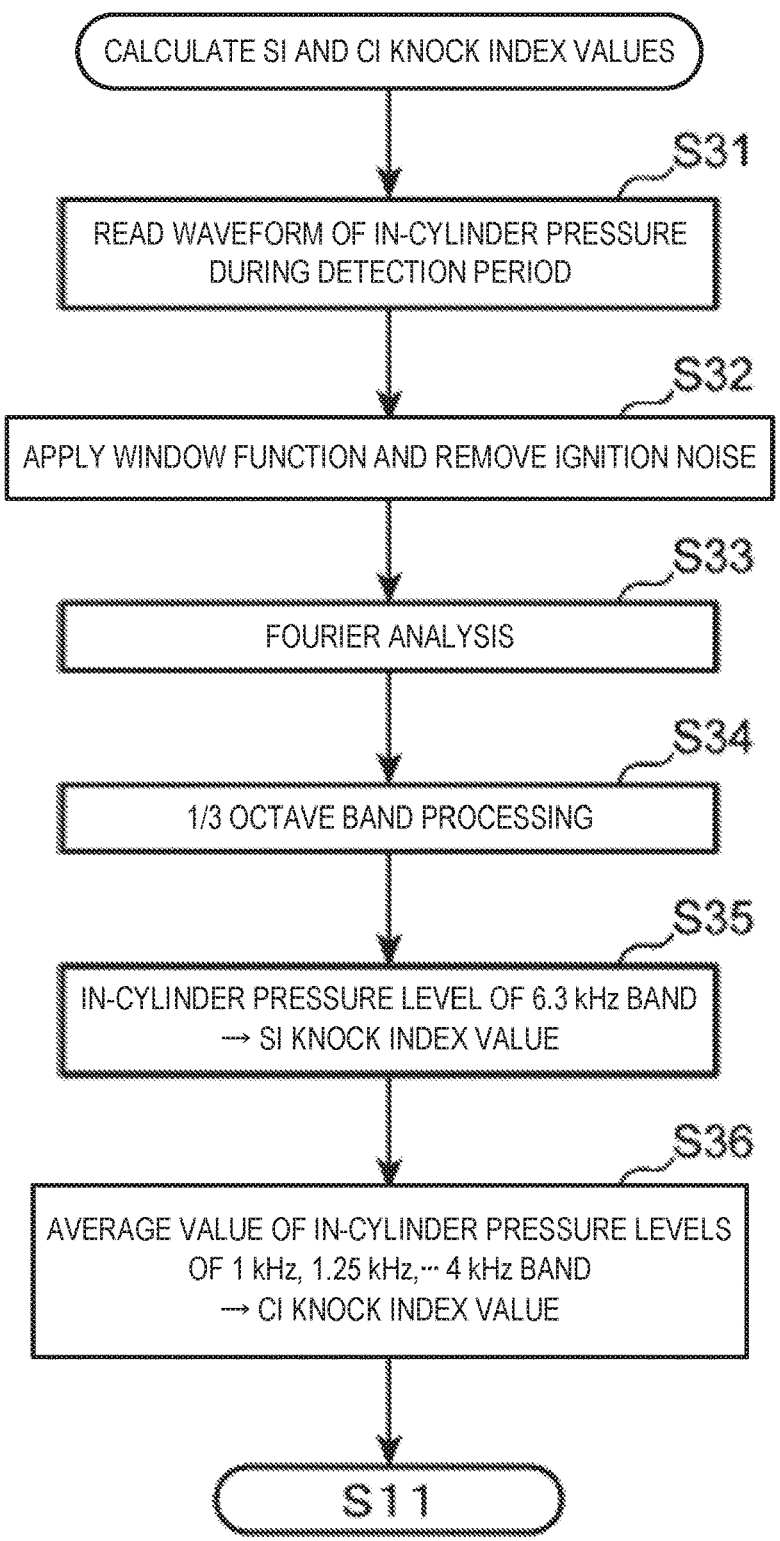
FIG. 10 is a subroutine illustrating a specific flow of a control at S10 of FIG. 8.

FIG. 10 is a subroutine illustrating a specific flow of the control at S10 at which the SI and CI knock index values are determined. When the control illustrated in this subroutine starts, the ECU 100 reads the waveform of the in-cylinder pressure detected by the in-cylinder pressure sensor SN2 during the detection period (S31).

Figure 14:
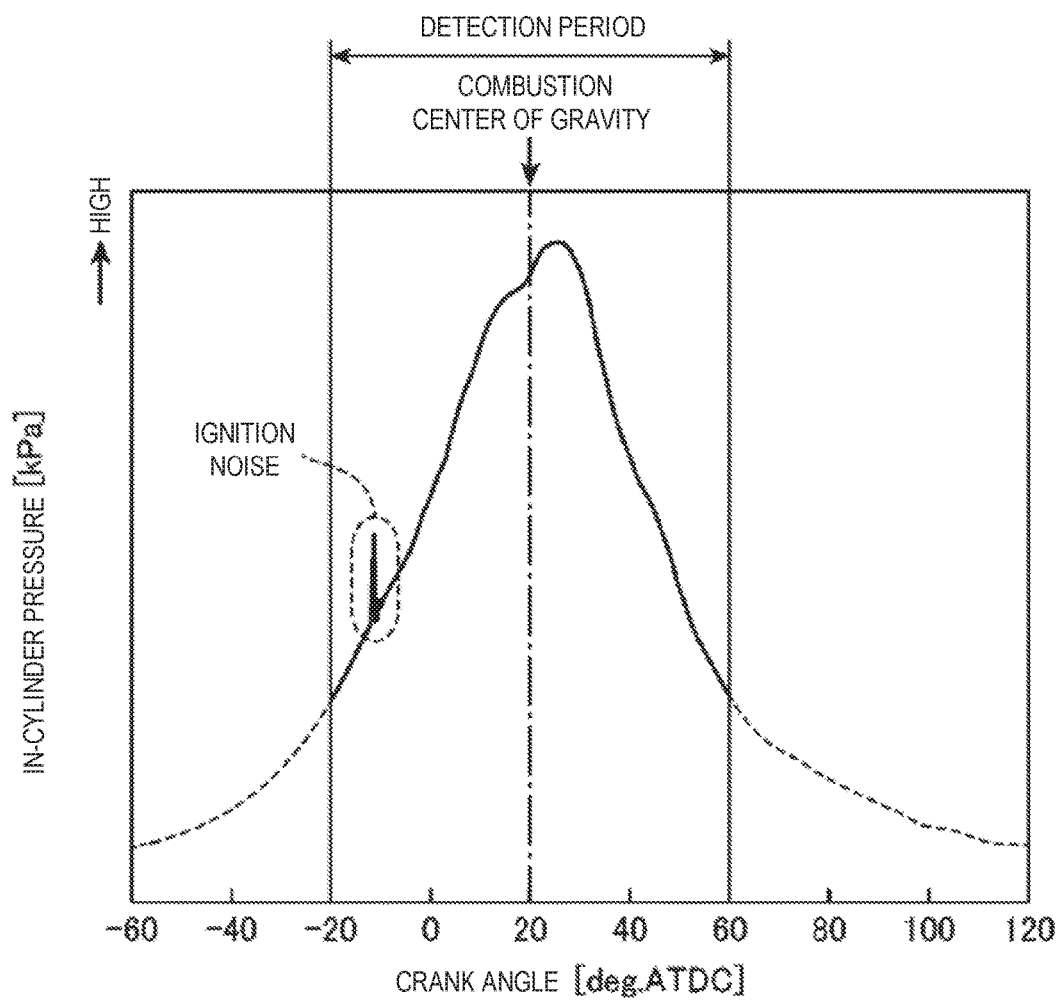
FIG. 14 is a chart illustrating a waveform of in-cylinder pressure detected by an in-cylinder pressure sensor.

FIG. 14 is a chart illustrating one example of the waveform of the in-cylinder pressure read at S31. Note that the crank angle displayed on the horizontal axis of the chart is the crank angle (deg. ATDC) when CTDC is 0° CA. In this example, the combustion center of gravity is estimated to be around 20° CA ATDC, and a period including 40° CA before and after the combustion center of gravity (a period from ATDC−20° CA to ATDC 60° CA) is set as the detection period. The detected waveform within this detection period includes ignition noise which is noise caused by the ignition of the spark plug 16.

Next, the ECU 100 applies a given window function to the waveform of the in-cylinder pressure read at S31 to remove the ignition noise (S32).

Figure 15:
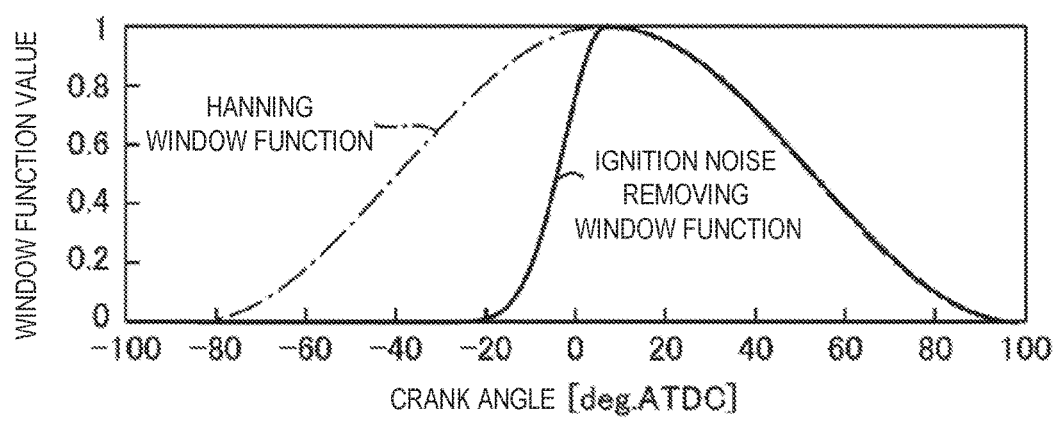
FIG. 15 is a chart illustrating a window function applied to a pressure waveform of FIG. 14.

FIG. 15 is a chart illustrating a window function (hereinafter, referred to as "ignition noise removing window function") used at S32. In the chart of FIG. 15, the ignition noise removing window function is indicated by a solid line, while the window function (the so-called Hanning window function) generally used in Fourier analysis is indicated by a one-dotted chain line. As is apparent from the comparison between the two functions, the ignition noise removing window function is, different from the Hanning window function, modified so that the function value becomes zero over a given period before and after the ignition timing. By applying such an ignition noise removing window function to the pressure waveform of FIG. 14, a pressure waveform removed of the ignition noise is obtained as indicated by a solid line of FIG. 16. Note that the waveform of the one-dotted chain line of FIG. 16 is a pressure waveform when the Hanning window function described above is applied, and it can be understood that the ignition noise remains in this case.

Figure 16:
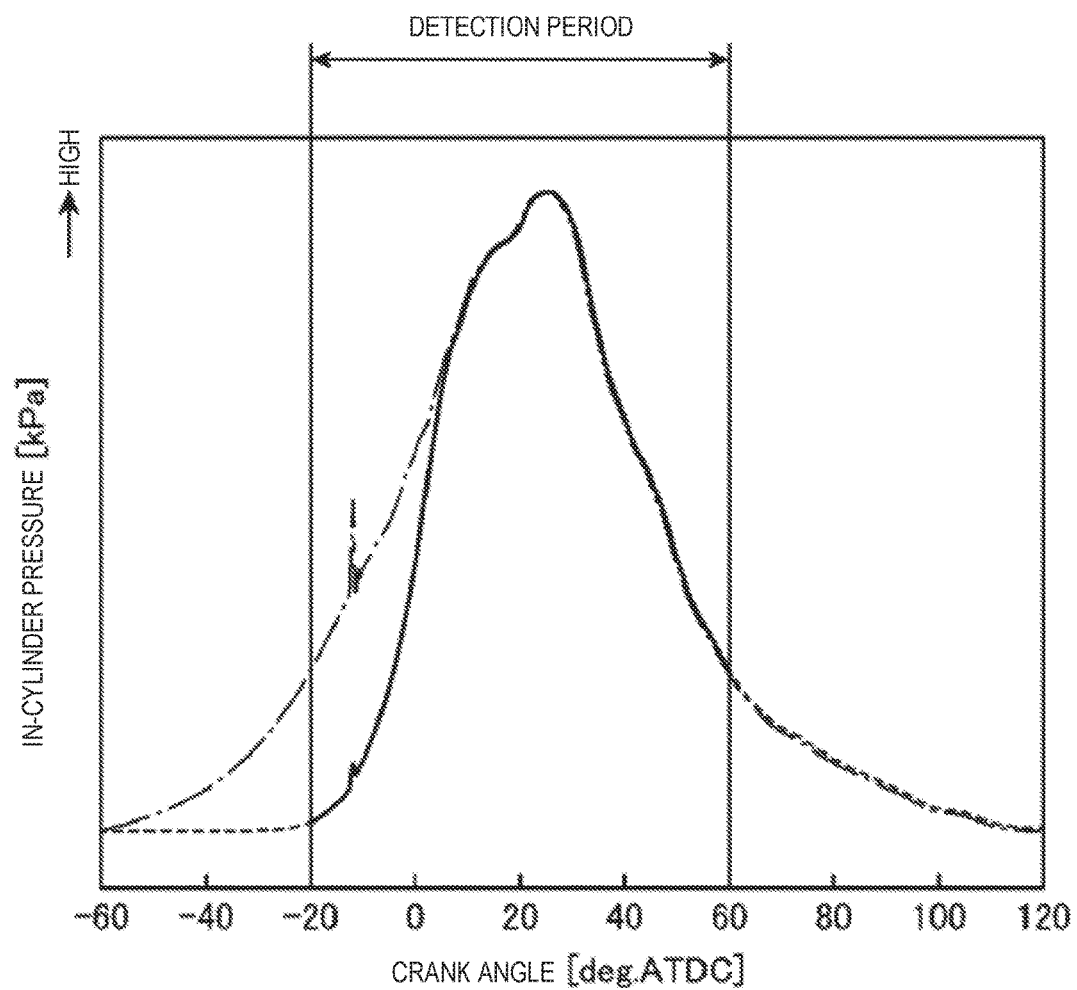
FIG. 16 is a chart illustrating a waveform of in-cylinder pressure obtained after applying the window function of FIG. 15.
Figure 17:
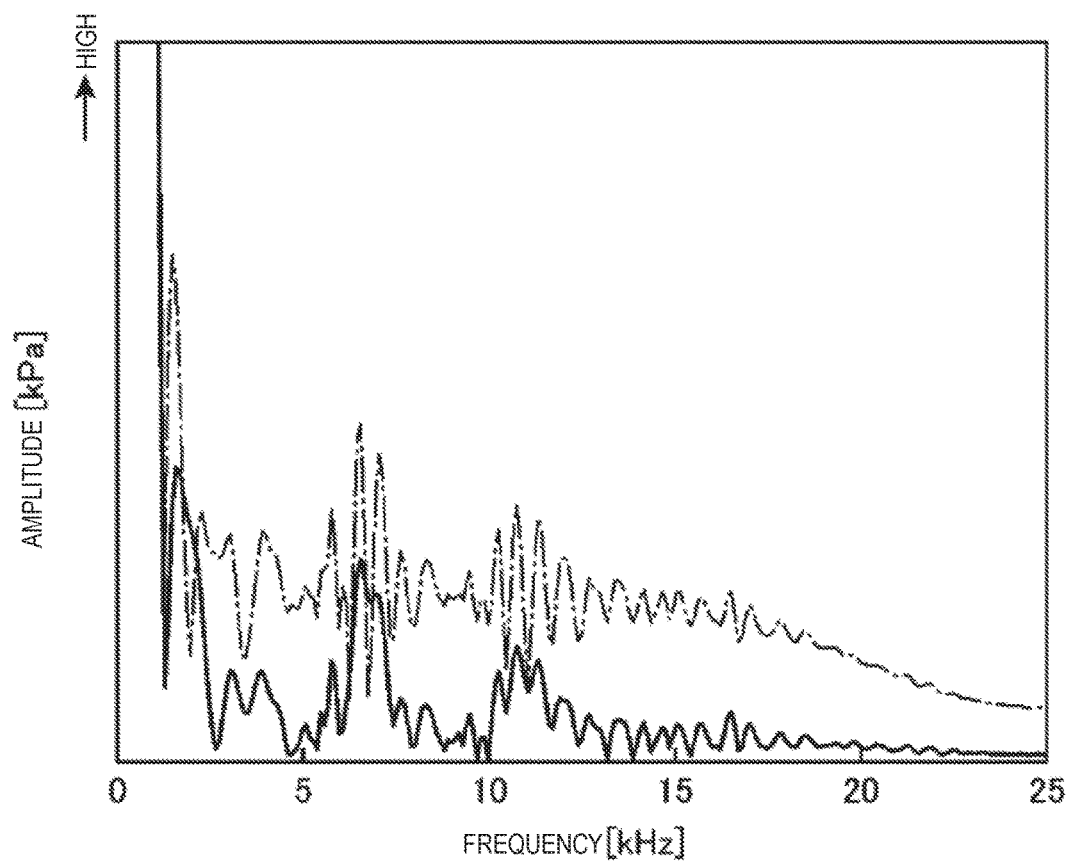
FIG. 17 is a chart illustrating a result of performing Fourier analysis on the pressure waveform of FIG. 16.

Next, the ECU 100 conducts the Fourier analysis on the pressure waveform obtained by applying the ignition noise removing window function to the detected waveform indicated by the solid line in FIG. 16, i.e., the detected waveform of the in-cylinder pressure, and obtains an amplitude for each frequency component (S33). FIG. 17 is a chart illustrating a frequency spectrum obtained by this Fourier analysis. It can be understood from this chart that, in the analysis result of S33, that is, a spectrum (solid line) obtained by the Fourier analysis of the waveform after the application of the ignition noise removing window function, the amplitude for each frequency component is greatly different from a spectrum (dashed line) in the case of applying the Hanning window function. That is, according to the method of this embodiment in which the ignition noise removing function is applied and then the Fourier analysis is conducted, unnecessary frequency components caused by the ignition noise does not mix in and the original frequency component in the waveform of the in-cylinder pressure is accurately extracted.

Figure 18:
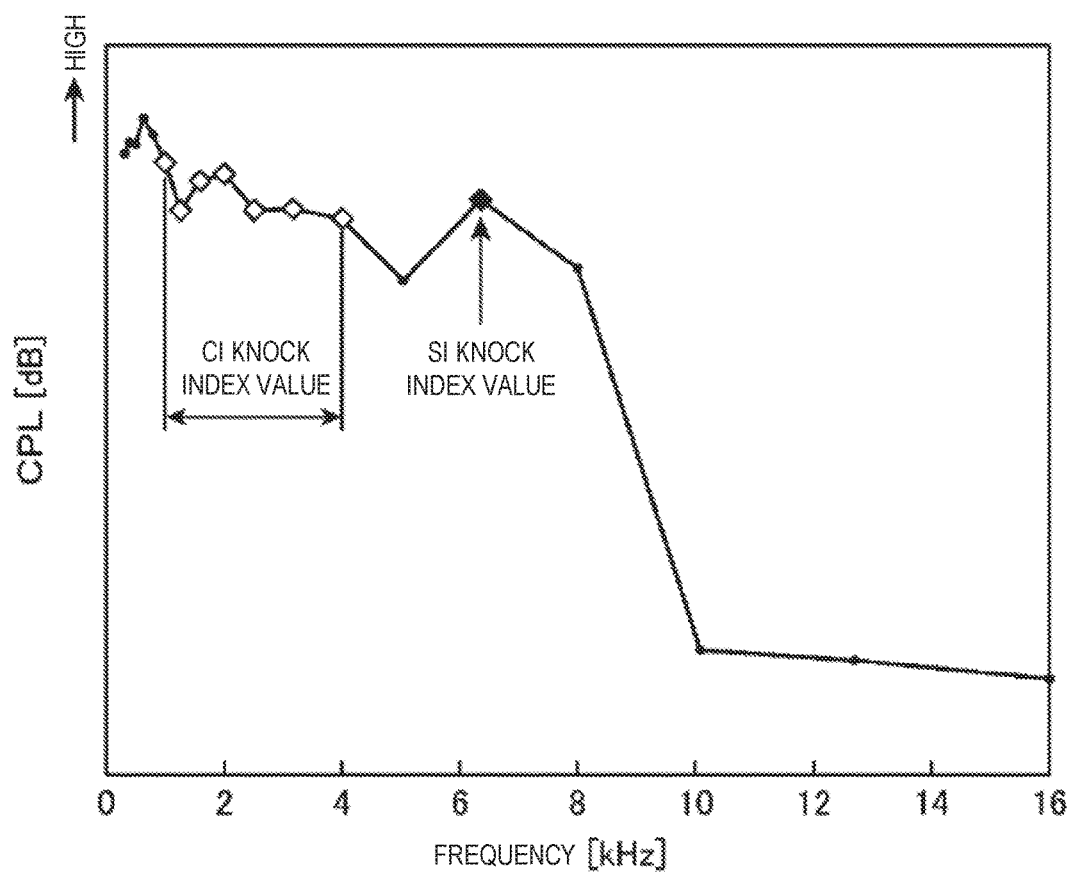
FIG. 18 is a chart illustrating a result of performing ⅓ octave band processing on a frequency spectrum of FIG. 17.

Next, the ECU 100 performs ⅓ octave band processing on the result of the Fourier analysis at S33 (frequency spectrum) (S34). The ⅓ octave band processing is processing of dividing each octave range (a range from a certain frequency to a frequency twice thereof) of the frequency spectrum into three and calculating an in-cylinder pressure level (CPL) of each divided band. Thus, as illustrated in FIG. 18, for example, the in-cylinder pressure level of each of the bands having center frequencies of 1 kHz, 1.25 kHz, 1.6 kHz, 2 kHz, 2.5 kHz, 3.15 kHz, 4 kHz, 5 kHz, 6.3 kHz, 8.0 kHz, . . . , respectively, is specified.

Next, the ECU 100 calculates the SI knock index value and the CI knock index value based on the result of the ⅓ octave band processing at S34 (FIG. 18) (S35 and S36). For example, the ECU 100 calculates the in-cylinder pressure level indicated by the plotted solid diamond in FIG. 18, i.e., the in-cylinder pressure level of the band having the center frequency of 6.3 kHz, as the SI knock index value (S35). Further, the ECU 100 calculates an average value of the in-cylinder pressure levels indicated by the plotted hollow diamonds in FIG. 18, i.e., the in-cylinder pressure levels of the bands having the center frequencies of 1 kHz, 1.25 kHz, 1.6 kHz, 2 kHz, 2.5 kHz, 3.15 kHz, and 4 kHz, as the CI knock index value (S36). As described above, when noise near 6.3 kHz increases and CI knock occurs, since noise around 1 to 4 kHz also increases, the in-cylinder pressure level of the 6.3 kHz band supposedly particularly rises when SI knock occurs, and the average value of the in-cylinder pressure levels of the 1 to 4 kHz (1 kHz, 1.25 kHz, . . . , 4 kHz) bands supposedly particularly rises when CI knock occurs. Therefore, in this embodiment, the in-cylinder pressure level of the 6.3 kHz band is calculated as the SI knock index value, and the average value of the in-cylinder pressure levels of the 1 to 4 kHz bands is calculated as the CI knock index value.

Returning to FIG. 8, the ECU 100 calculates and updates the standard deviation (1σ) of the SI knock index value based on the latest SI knock index value calculated at S35 and the plurality of SI knock index values accumulated previously, and calculates and updates the standard deviation (1σ) of the CI knock index value based on the latest CI knock index value calculated at S36 and the plurality of CI knock index values accumulated previously (S11). Next, the standard deviations (1σ) of the SI and CI knock index values updated in this manner are used as the margins a and b (FIG. 11) when determining the allowable limits W1 and W2 of the SI and CI knock index values, respectively. Note that the standard deviations (1σ) of the SI and CI knock index values may be obtained from the accumulated SI and CI knock index values, for example, over a latest given period or separately for every similar operating condition.

Next, the ECU 100 calculates the combustion center of gravity based on the waveform of the in-cylinder pressure during the detection period and corrects the estimation model of the combustion center of gravity based on the calculated combustion center of gravity (S12). That is, the ECU 100 estimates the generated heat amount (heat generation amount) accompanying the combustion for each crank angle based on the waveform of the in-cylinder pressure detected by the in-cylinder pressure sensor SN2 during the detection period, and the combustion center of gravity at the timing when 50% mass of the fuel combusts is calculated based on the data of the heat generation amount for each crank angle. Further, the estimation model for estimating the combustion center of gravity is corrected based on the deviation between this calculated combustion center of gravity and the combustion center of gravity estimated at S7. The correction of this estimation model leads to improving the accuracy in estimating the combustion center of gravity under the similar condition next time and thereafter (the reduction of the deviation between the estimated value and the actual value).

(6) Operations and Effects

As described above, in this embodiment, the SI knock index value correlated with SI knock in which the unburnt gas outside the SI combustion area rapidly combusts by abnormal local self-ignition (thus causing noise around 6.3 kHz) and the CI knock index value correlated with CI knock in which the engine components resonate due to the CI combustion (thus causing noise around 1 to 4 kHz) are specified based on the detected value of the in-cylinder pressure by the in-cylinder pressure sensor SN2. Moreover, the target $\theta ci$ is determined based on the specified SI and CI knock index values and a relationship between these index values obtained beforehand and $\theta ci$ (maps M3 and M4), and a control, such as adjusting the ignition timing, is executed to achieve the target $\theta ci$.

Therefore, $\theta ci$ is set at a suitable timing based on the actual SI and CI knock index values, and these index values are prevented from becoming excessive, that is, combustion noises (SI knock and CI knock) are prevented from becoming excessive.

Particularly, since the knock index values are obtained for SI knock caused by the SI combustion and CI knock caused by the CI combustion and the target $\theta ci$ is determined based on these knock index values, during the execution of the SPCCI combustion combined the SI combustion and the CI combustion, i.e., during the operation in which both SI knock and CI knock are concerned, these SI knock and CI knock are avoided from becoming apparent and it is effectively prevented that a person on board senses harsh noise caused by each knock. As a result, the engine fuel efficiency is improved while its quietness is sufficiently ensured.

For example, in this embodiment, the final target $\theta ci$ is determined to be the timing so that the SI knock index value and the CI knock index value do not exceed the respective allowable limits W1 and W2, and the ignition timing etc. are controlled so that the determined target $\theta ci$ is achieved. Therefore, the SI knock index value and the CI knock index value are more reliably prevented from exceeding the respective allowable limits W1 and W2, and the quietness is more reliably secured.

More specifically, in this embodiment, the first $\theta ci$ limit which is the limit of the start timing of the CI combustion by which the SI knock index value is kept below the allowable limit W1 is obtained based on the map M3 defining the relationship between the start timing $\theta ci$ of the CI combustion and the SI knock index value, the second $\theta ci$ limit which is the limit of the start timing of the CI combustion by which the CI knock index value is kept below the allowable limit W2 is obtained based on the map M4 defining the relationship between the start timing $\theta ci$ of the CI combustion and the CI knock index value, and a timing not earlier than either of the first $\theta ci$ limit and the second $\theta ci$ limit is determined as the target $\theta ci$. For example, the timing corresponding to the later one of the first and second $\theta ci$ limits is determined as the target $\theta ci$, or a timing later than both the first and second $\theta ci$ limits (if the standard $\theta ci$ which is the initial target value is later than the first and second $\theta ci$ limits, the standard $\theta ci$) is determined as the target $\theta ci$.

Therefore, the first $\theta ci$ limit for keeping the SI knock index value lower than the allowable limit W1 and the second $\theta ci$ limit for keeping the CI knock index value lower than the allowable limit W2 are suitably derived using the given characteristic maps M3 and M4, and by controlling the ignition timing so that the CI combustion does not start earlier than the first and second $\theta ci$ limits, both the SI knock index value and the CI knock index value are reliably kept lower than the allowable limits W1 and W2, respectively.

Further, in this embodiment, the allowable limits W1 and W2 of the SI and CI knock index values are set based on the distributions of the SI and CI knock index values at a plurality of time points, respectively. In other words, each of the allowable limits W1 and W2 is set in consideration of the distribution (variation) of the SI/CI knock index value.

Therefore, the possibility that loud combustion noise exceeding the allowable limit incidentally occurs is reduced.

Particularly, in this embodiment, since the values obtained by subtracting the standard deviations ($1\sigma$) of the plurality of SI and CI knock index values at a plurality of past time points from the basic limits V1$x$ and V2$x$ of the SI and CI knock index values, respectively, are set as the allowable limits W1 and W2 of the SI and CI knock index values, the SI and CI knock index values are prevented from exceeding the allowable limits W1 and W2 at a high possibility of about 90%.

Further, in this embodiment, the SI and CI knock index values are specified based on the in-cylinder pressures detected by the in-cylinder pressure sensor SN2 over the given period (the period illustrated in FIG. 14 etc. as the detection period) defined as a finite period including at least the combustion center of gravity at the timing when 50% mass of the fuel supplied to the cylinder combusts. Therefore, the SI and CI knock index values are appropriately calculated based on the detection pressure in the period extending over the SI combustion and the subsequent CI combustion. Further, since the in-cylinder pressure detected during a period unrelated to the SI knock and CI knock (the period not during combustion) is excluded from the analysis target for calculating the SI and CI knock index values, the workload for calculating the SI and CI knock index values is reduced.

Further in this embodiment, the waveform of the in-cylinder pressure detected during the given period (detection period) is subjected to the Fourier analysis, the intensity of the frequency component correlated with the SI knock, that is, the in-cylinder pressure of the band having the center frequency of 6.3 kHz is calculated as the SI knock index value, and the average value of the in-cylinder pressures in the plurality of bands having the center frequencies at 1 to 4 kHz is calculated as the CI knock index value. Therefore, the levels of SI knock and CI knock which are caused by different factors are accurately captured as the intensities of the different frequency components corresponding to the respective knocks.

(7) Modifications

In this embodiment, the case where the SI knock index value and the CI knock index value are individually obtained, and after the first θci limit which is the limit of the start timing of the CI combustion by which the SI knock index value is kept lower than the allowable limit W1, and the second θci limit which is the limit of the start timing of the CI combustion by which the CI knock index value is kept lower than the allowable limit W2 are individually obtained, the final target value of θci is set based on the first θci limit and the second θci limit, is described. However, an index value combined both the SI knock index value and the CI knock index value may be calculated as a combustion noise index value, and θci may be controlled based on this value. For example, the higher or lower one of the calculated SI and CI knock index values may be calculated as the combustion noise index value, and by having such θci that the combustion noise index value does not exceed the allowable limit as the target value, the ignition timing etc. may be controlled so that this target value is achieved.

Although in this embodiment, the SI and CI knock index values are specified based on the in-cylinder pressure detected by the in-cylinder pressure sensor SN2 (detector), the parameter which needs to be detected in order to specify the SI and CI knock index values may be any parameter as long as it relates to noise accompanying combustion, and the in-cylinder pressure is merely one example. For example, vibration (vibration acceleration) of the engine body 1 or noise itself which the engine body 1 produces may be detected as the parameter. That is, the detector of the present disclosure may use, other than the in-cylinder pressure, a vibration sensor configured to detect the vibration of the engine body 1, a noise sensor configured to detect noise, etc.

Although in this embodiment, the average value of the in-cylinder pressures in the bands of 1 kHz, 1.25 kHz, 1.6 kHz, 2 kHz, 2.5 kHz, 3.15 kHz, and 4 kHz obtained by Fourier analysis on the detected waveform of the in-cylinder pressure is calculated as the CI knock index value, alternatively, a highest value of the in-cylinder pressures in these bands may be calculated as the CI knock index value. Further, since CI knock is a resonance phenomenon with the engine components and resonance frequencies are naturally limited to a few frequencies, the CI knock index value may be calculated using only the in-cylinder pressure levels in a limited band closest to each resonance frequency. In other words, the in-cylinder pressure levels in a part of each band far from the resonance frequency may be disregarded.

Although in this embodiment, the target θci (the target value of the start timing θci of the CI combustion) with which the SI and CI knock index values do not exceed the respective allowable limits W1 and W2 is set and the ignition timing by the spark plug 16 is adjusted to achieve the target θci, alternatively/additionally to the ignition timing, the fuel injection timing from the injector 15 may be adjusted. Furthermore, both the fuel injection timing and the fuel injection amount may be adjusted.

Although in this embodiment, the booster 33 (supercharger) mechanically driven by the engine body 1 is provided in the intake passage 30, instead of such a mechanical booster 33 (supercharger), an electric booster driven by a motor, or a turbocharger driven by the energy of the exhaust gas may be provided.

Although in this embodiment, the cavity 20 having a donut shape in the plan view to surround the conical-shaped bulge portion 20a is formed in the crown surface of the piston 5, the concave portion of the cavity 20 facing the spark plug 16, that is, the concave portion located on the intake side of the bulge portion 20a, may be formed so as to be smaller than the concave portion on the opposite side (exhaust side). In this manner, when the fuel is injected from the injector 15 in the final stage of the compression stroke, fuel spray is moved to the vicinity of the electrode of the spark plug 16 more promptly.

Although in this embodiment, the intake and exhaust VVTs 13a are 14a are controlled to form the valve overlap period in which both the intake and exhaust valves 11 and 12 are opened over TDC of the exhaust stroke when performing the internal EGR in which the burned gas is left in the combustion chamber 6, conversely, the internal EGR may be performed by forming a so-called negative overlap period in which both the intake and exhaust valves 11 and 12 are closed over TDC of the exhaust stroke.

Although in this embodiment, the control target values of the ignition timing etc. are set in advance so that the target SI ratio determined for each operating condition is achieved, and the feedback control is executed based on the SI and CI knock index values so that the ignition timing is corrected when the combustion noise is loud (the SI and CI knock index values exceed the allowable limits W1 and W2), additionally, a feedback control based on the SI ratio may further be performed. That is, the SI ratio in each combustion (SPCCI combustion) may be calculated as needed based on the detected waveform of the in-cylinder pressure sensor SN2 etc., and when the calculated SI ratio deviates from the target SI ratio, the ignition timing, the fuel injection amount, the fuel injection timing, etc. may be corrected to reduce the deviation. In this case, it can be considered that the correction amount of the ignition timing etc. required to bring the SI ratio closer to the target SI ratio, and the correction amount of the ignition timing etc. required so that the SI and CI knock index values do not to exceed the respective allowable limits do not necessarily match. When these correction amounts do not match, the correction amount based on the SI and CI knock index values may be adopted.

Moreover, when calculating the SI ratio of each combustion as described above, various specific methods can be considered to calculate this SI ratio.

For example, the heat generation rate at each crank angle timing may be calculated from the detected waveform by the in-cylinder pressure sensor SN2, and the areas Q1 and Q2 illustrated in FIG. 7 may be calculated based on the data (waveform) of the calculated heat generation rate. In this case, although the SI ratio may be calculated as SI ratio=Q1/(Q1+Q2) as described above, alternatively, SI ratio=Q1/Q2 may be established.

Figure 19:
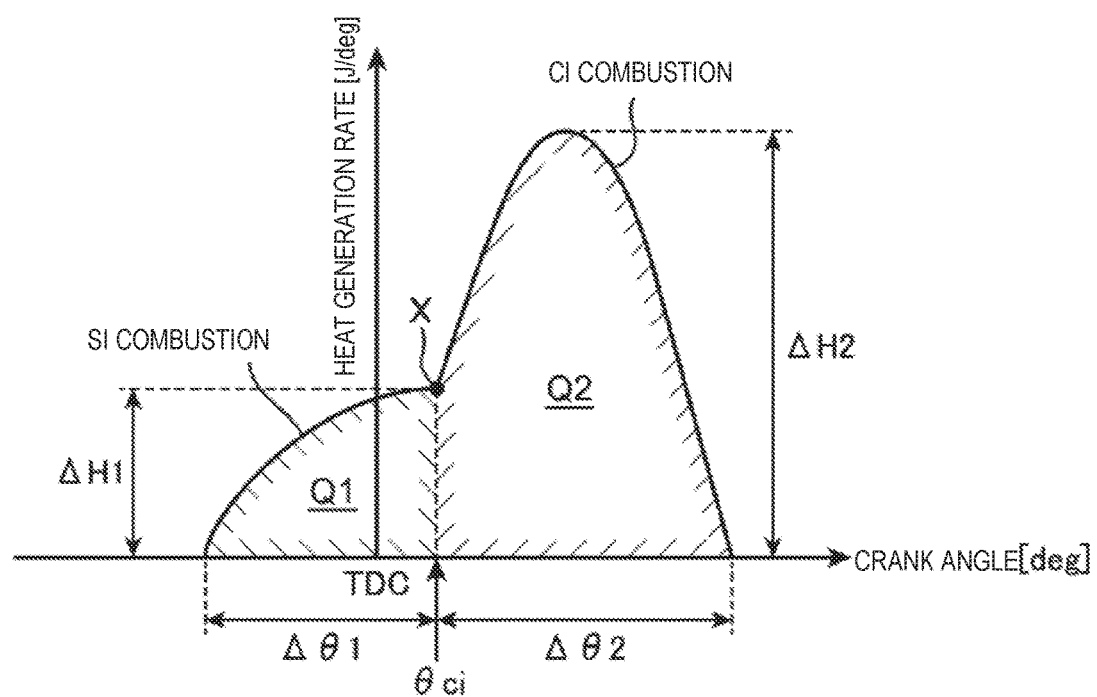
FIG. 19 is a chart corresponding to FIG. 7, illustrating various defining methods of an SI ratio.

Further, the SI ratio may be calculated using $\Delta\theta1$ and $\Delta\theta2$ illustrated in FIG. 19. That is, when the crank angle period of the SI combustion (the crank angle period on the advancing side of the flection point X) is $\Delta\theta1$ and the crank angle period of the CI combustion (the crank angle period on the retarding side of the flection point X) is $\Delta\theta2$, SI ratio=$\Delta\theta1/(\Delta\theta1+\Delta\theta2)$ or SI ratio=$\Delta\theta1/\Delta\theta2$ may be established.

Furthermore, when a peak of the heat generation rate of the SI combustion is $\Delta H1$ and a peak of the heat generation rate of the CI combustion is $\Delta H2$, SI ratio=$\Delta H1/(\Delta H1+\Delta H2)$ or SI ratio=$\Delta H1/\Delta H2$ may be established.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder

15 Injector
16 Spark Plug
100 ECU
M3 Map (Characteristic, First Characteristic)
M4 Map (Characteristic, Second Characteristic)
SN2 In-cylinder Pressure Sensor (Detector)
W1 Allowable Limit (of SI Knock Index Value)
W2 Allowable Limit (of CI Knock Index Value)
V1 Basic Limit (of SI Knock Index Value; Reference Limit)
V2 Basic Limit (of CI Knock Index Value; Reference Limit)

What is claimed is:

1. A control system for a compression-ignition engine, comprising:
    an engine including a cylinder, a piston, a cylinder head, and a combustion chamber formed by the cylinder, the piston, and the cylinder head;
    a spark plug disposed in the combustion chamber;
    a fuel injection valve disposed to be oriented into the combustion chamber;
    an in-cylinder pressure sensor connected to the combustion chamber and configured to detect pressure inside the combustion chamber; and
    a control unit including a processor connected to the spark plug, the fuel injection valve, and the pressure sensor, and configured to output a control signal to the spark plug, the fuel injection valve, and the pressure sensor, respectively, the control unit executing:
        a combustion noise index value calculating module to calculate, based on the output value of the in-cylinder pressure sensor, a first combustion noise index value that is an in-cylinder pressure level at a given high frequency, and a second combustion noise index value that is an in-cylinder pressure level at a given low frequency;
        a limit value calculating module to calculate a limit value of a start timing of the CI combustion based on the first combustion noise index value and the second combustion noise index value;
        an ignition timing setting module to set an ignition timing so that the start timing of the CI combustion does not advance beyond the limit value; and
        a spark plug controlling module to output an ignition instruction to the spark plug at the ignition timing set by the ignition timing setting module.

2. The control system of claim 1, wherein the control unit obtains a distribution of a plurality of combustion noise index values calculated at a plurality of time points, sets an allowable limit of the first and second combustion noise index values based on the distribution, determines a target θci that is a target start timing of the CI combustion based on the allowable limit and a characteristic, and controls the combustion inside the cylinder to achieve the determined target θci.

3. The control system of claim 1,
    wherein the control unit is further configured to execute:
        a detection period setting module to set a crank angle period in which the in-cylinder pressure sensor sequentially performs the detection; and
        an amplitude value calculating module to calculate an amplitude value of the in-cylinder pressure for each frequency based on an output value of the in-cylinder pressure sensor during the detection period,
    wherein the combustion noise index value calculating module calculates the first combustion noise index value and the second combustion noise index value based on an output value of the amplitude value calculating module.

4. The control system of claim 3, wherein the limit value calculating module calculates the start timing limit value of the CI combustion based on an allowable limit map in which the allowable value of the first combustion noise index value is set higher as an engine speed increases, and an allowable limit map in which the allowable value of the second combustion noise index value is set higher as the engine speed increases.

5. The control system of claim 3, wherein the limit value calculating module calculates the start timing limit value of the CI combustion based on an allowable limit map in which the allowable value of the first combustion noise index value is set higher as an engine load increases, and an allowable limit map in which the allowable value of the second combustion noise index value is set higher as the engine load increases.

6. A control device for an engine in which partial compression-ignition combustion including spark ignition (SI) combustion performed by forcibly combusting a portion of mixture gas inside a cylinder followed by compression ignition (CI) combustion performed by causing the rest of the mixture gas inside the cylinder to self-ignite is executed within a part of an operating range of the engine, comprising:
    a detector configured to detect a parameter related to noise caused by the combustion inside the cylinder;
    a memory configured to store a characteristic defining a relationship between a start timing of the CI combustion and a combustion noise index; and
    a processor configured to:
        specify a given combustion noise index value based on the detection value of the detector; and
        control the start timing of the CI combustion based on the characteristic and the combustion noise index value.

7. The control device of claim 6, wherein the processor obtains a distribution of a plurality of combustion noise index values calculated at a plurality of time points, sets an allowable limit of the combustion noise index value based on the distribution, determines a target θci that is a target start timing of the CI combustion based on the allowable limit and the characteristic, and controls the combustion inside the cylinder to achieve the determined target θci.

8. The control device of claim 7, wherein the processor specifies, based on the detection value of the detector, an SI knock index value correlated with SI knock in which unburned gas outside an area of the cylinder where the SI combustion of the mixture gas occurs combusts rapidly by abnormal local self-ignition, and a CI knock index value correlated with CI knock in which noise at a lower frequency than that in the SI knock occurs during the CI combustion, as the combustion noise index value,
    wherein the memory stores, as the characteristic, a first characteristic defining the relationship between the start timing of the CI combustion and the SI knock index value, and a second characteristic defining the relationship between the start timing of the CI combustion and the CI knock index value, and
    wherein the processor sets an allowable limit of the SI knock index value based on a distribution of a plurality of SI knock index values specified at a plurality of time points and the first characteristic, and an allowable limit of the CI knock index value based on a distribution of a plurality of CI knock index values specified at a plurality of time points and the second characteristic, obtains a first θci limit that is a limit of the start timing of the CI combustion by which the SI knock index value is kept below the allowable limit based on the first characteristic stored in the memory, obtains a second θci limit that is a limit of the start timing of the CI combustion by which the CI knock index value is kept below the allowable limit based on the first characteristic stored in the memory, determines a timing that is the same as or later than either one of the first θci limit and the second θci limit as the target θci, and controls the combustion inside the cylinder so that the determined target θci is achieved.

9. The control device of claim 8, wherein the processor calculates a standard deviation among the plurality of SI knock index values; sets, as the allowable limit of the SI knock index value, a value obtained by subtracting the standard deviation among the SI knock index values from a given reference limit of the SI knock index value; calculates a standard deviation among the plurality of CI knock index values; and sets, as the allowable limit of the CI knock index value, a value obtained by subtracting the standard deviation among the CI knock index values from a given reference limit of the CI knock index value.

10. A method of controlling a compression-ignition engine including a cylinder, a piston, a cylinder head, a combustion chamber formed by the cylinder, the piston, and the cylinder head, a spark plug disposed in the combustion chamber, and a fuel injection valve disposed to be oriented into the combustion chamber, comprising:
   detecting an in-cylinder pressure that is a pressure inside the combustion chamber;
   calculating, based on the detected in-cylinder pressure, a first combustion noise index value that is an in-cylinder pressure level at a given high frequency, and a second combustion noise index value that is an in-cylinder pressure level at a given low frequency;
   calculating a limit value of a start timing of the CI combustion based on the first combustion noise index value and the second combustion noise index value;
   setting an ignition timing so that the start timing of the CI combustion does not advance beyond the limit value; and
   causing the spark plug to ignite at the set ignition timing.

11. The method of claim 10, further comprising:
   obtaining a distribution of a plurality of combustion noise index values calculated at a plurality of time points;
   setting an allowable limit of the first and second combustion noise index values based on the distribution;
   determining a target θci that is a target start timing of the CI combustion based on the allowable limit and a characteristic; and
   controlling the combustion inside the cylinder to achieve the determined target θci.

12. The method of claim 10, further comprising:
   setting a crank angle period in which the in-cylinder pressure is sequentially detected;
   calculating an amplitude value of the in-cylinder pressure for each frequency based on the detected in-cylinder pressure during the detection period; and
   calculating the first combustion noise index value and the second combustion noise index value based on the calculated amplitude value.

13. The method of claim 12, wherein the start timing limit value of the CI combustion is calculated based on an allowable limit map in which the allowable value of the first combustion noise index value is set higher as an engine speed increases, and an allowable limit map in which the allowable value of the second combustion noise index value is set higher as the engine speed increases.

14. The method of claim 12, wherein the start timing limit value of the CI combustion is calculated based on an allowable limit map in which the allowable value of the first combustion noise index value is set higher as an engine load increases, and an allowable limit map in which the allowable value of the second combustion noise index value is set higher as the engine load increases.

* * * * *